US012448903B1

(12) United States Patent
Miller et al.

(10) Patent No.: US 12,448,903 B1
(45) Date of Patent: Oct. 21, 2025

(54) TURBINE ENGINE HAVING A LUBRICATION SYSTEM WITH A GEARBOX LUBRICATION SYSTEM PARAMETER

(71) Applicants: General Electric Company, Evendale, OH (US); GE Avio S.r.l., Rivalta di Torino (IT)

(72) Inventors: Brandon W. Miller, Middletown, OH (US); Miriam Manzoni, Rivalta di Torino (IT); Rosa Addabbo, Castellaneta (IT); Alessandro Anderlini, Poggibonsi (IT); Marco Sandrucci, Certaldo (IT); Federico Leonardi, Vinovo (IT); Andrew Hudecki, Milford, OH (US)

(73) Assignees: GENERAL ELECTRIC COMPANY, Evendale, OH (US); GE AVIO S.R.L., Rivalta di Torino (IT)

(*) Notice: Subject to any disclaimer, the term of this patent is extended or adjusted under 35 U.S.C. 154(b) by 0 days.

(21) Appl. No.: 18/975,887

(22) Filed: Dec. 10, 2024

(51) Int. Cl.
F01D 25/18 (2006.01)
F01D 25/20 (2006.01)
(Continued)

(52) U.S. Cl.
CPC ............ F01D 25/18 (2013.01); F01D 25/20 (2013.01); F02C 7/06 (2013.01); F02C 7/36 (2013.01);
(Continued)

(58) Field of Classification Search
CPC .. F01D 25/18; F01D 25/20; F02C 7/06; F02C 7/36; F02C 3/107; F05D 2260/40311; F05D 2260/98
See application file for complete search history.

(56) References Cited

U.S. PATENT DOCUMENTS 7,845,587 B2 12/2010 Fuller et al.
10,677,095 B2 6/2020 Vielcanet et al.
(Continued)

FOREIGN PATENT DOCUMENTS

FR 3127024 A1 3/2023
FR 3127025 A1 3/2023
(Continued)

Primary Examiner — Gerald L Sung
Assistant Examiner — Rene D Ford
(74) Attorney, Agent, or Firm — Venable LLP; Peter T. Hrubiec; Michele V. Frank

(57) ABSTRACT

A turbine engine including a turbo-engine, a gearbox assembly, a propulsor, and a lubrication system. The turbo-engine includes a compressor section, a combustor, a turbine section, and an input shaft. The gearbox assembly includes a first gear, a plurality of second gears, and a third gear. The propulsor has an output shaft drivingly coupled to the input shaft through the gear assembly. The lubrication system is characterized by a Gearbox Lubrication System Parameter (GLSP) between 0.2 and 140 when a mass flow rate of the lubricant is linear with a lubricant pump speed, where the GLSP is given by:

$$\frac{(1-\eta_{DP})}{N_{DP}^3 \times V_{GBX} \times N_S} \times \alpha \frac{dT_{OC}}{dT_{DP}} \times \frac{P_{DP}}{P_{OC}} \times \left(\frac{N_{DP}}{N_{OC}}\right)^2 \times 10^8.$$

The GLSP is between 0.2 and 70 when the mass flow rate of the lubricant is modulated, where the GLSP is given by:

$$\frac{(1-\eta_{DP})}{N_{DP}^3 \times V_{GBX} \times N_S} \times \alpha \frac{dT_{OC}}{dT_{DP}} \times \frac{P_{DP}}{P_{OC}} \times \left(\frac{N_{DP}}{N_{OC}}\right)^2 \times 10^8.$$

20 Claims, 12 Drawing Sheets

(51) Int. Cl.
  *F02C 7/06* (2006.01)
  *F02C 7/36* (2006.01)
  *F02C 3/107* (2006.01)

(52) U.S. Cl.
  CPC .... *F02C 3/107* (2013.01); *F05D 2260/40311* (2013.01); *F05D 2260/98* (2013.01)

(56) References Cited

U.S. PATENT DOCUMENTS

| | | |
|---|---|---|
| 11,149,652 B1 | 10/2021 | Spruce |
| 11,401,829 B2 | 8/2022 | Molesini et al. |
| 11,466,624 B1 | 10/2022 | Piazza et al. |
| 11,619,141 B2 | 4/2023 | Le Brun et al. |
| 11,802,516 B2 | 10/2023 | Molesini et al. |
| 2023/0332543 A1 | 10/2023 | Bemment et al. |

FOREIGN PATENT DOCUMENTS

| | | |
|---|---|---|
| FR | 3129436 A1 | 5/2023 |
| FR | 3129690 A1 | 6/2023 |
| FR | 3130747 A1 | 6/2023 |
| FR | 3130875 A1 | 6/2023 |

TURBINE ENGINE HAVING A LUBRICATION SYSTEM WITH A GEARBOX LUBRICATION SYSTEM PARAMETER

TECHNICAL FIELD

The present disclosure relates generally to turbine engines with lubrication systems, for example, for gearbox assemblies in turbine engines.

BACKGROUND

A turbine engine generally includes a propulsor (e.g., a fan or a propeller) and a turbo-engine arranged in flow communication with one another. A gearbox assembly transfers torque and power from one rotating component to another rotating component (e.g., from the turbo-engine to the propulsor). A lubrication system provides lubricant to one or more rotating components of the turbine engine, including the gearbox assembly.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
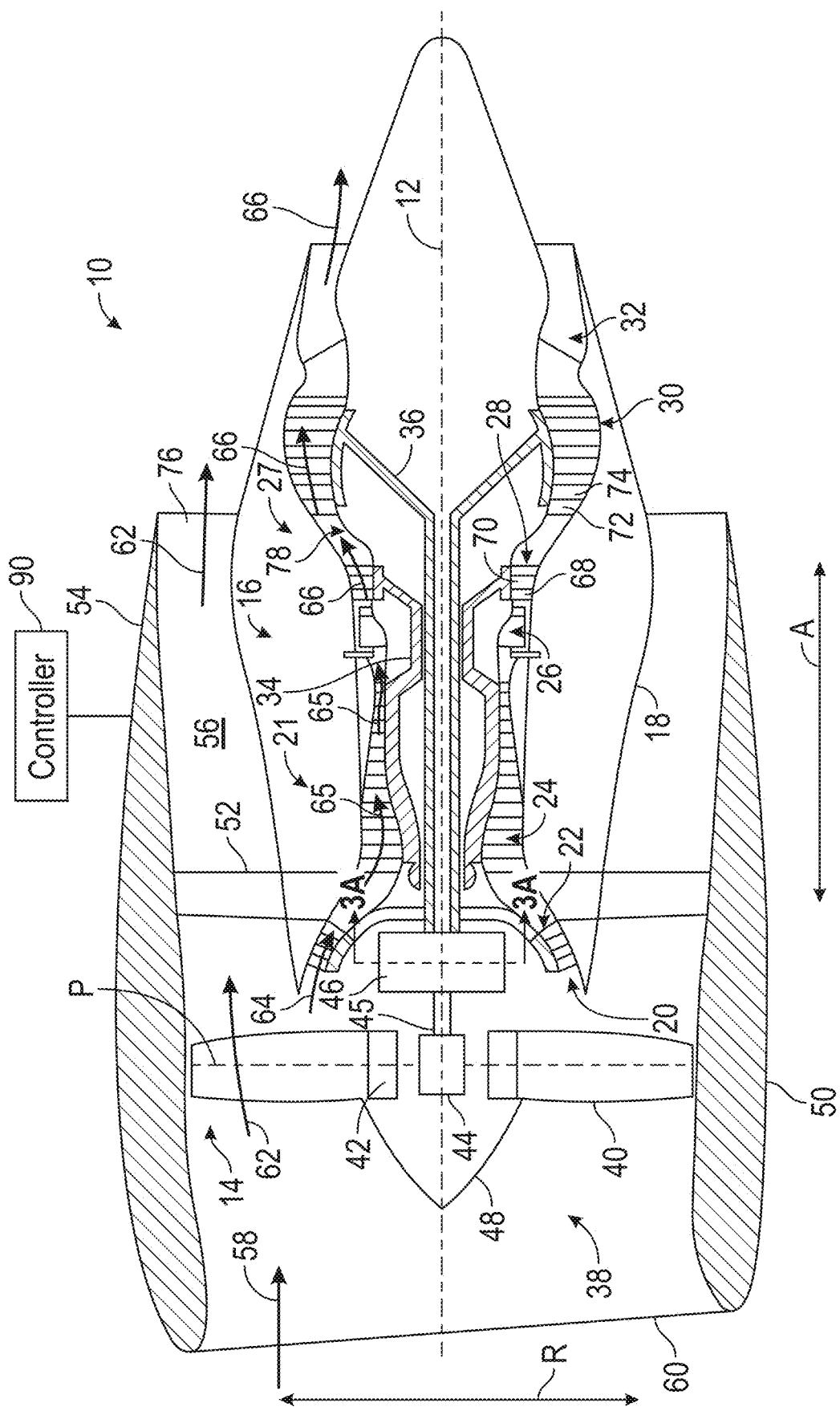
FIG. 1 is a schematic, cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," "second," "third," "fourth," "fifth," etc., may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "propulsor" is a component of the turbine engine that is drivingly coupled to the turbo-engine such that rotation of the components of the turbo-engine causes the propulsor to rotate and to generate thrust. A propulsor can include a fan or a propeller. In turbofan engines (e.g., ducted fan engines or unducted fan engines), the propulsor is a fan. In turboprop engines, the propulsor is a propeller.

As used herein, the terms "mesh," "meshing," or "intermesh" refer to a location between two gears at which gear teeth of the two gears become intertwined, or otherwise become mated.

As used herein, "friction" of two rotating components occurs at the interface of contact between the two rotating components and is the result of the contact of the two rotating components sliding and rolling with respect to each other. The friction is a function of the geometrical configuration and operative conditions (e.g., transmitted power through the two rotating components).

As used herein, "windage" of a rotating component occurs due to the interaction of the rotating component with the fluids (e.g., air or lubricant) surrounding the rotating component. The windage is caused by drag of the rotating component within the fluids and is a function of the geometrical configuration and operative conditions. One of the main drivers of the windage is the amount of lubricant interacting with the rotating component.

As used herein, a "gearbox efficiency (f)" is a ratio of output power from the gearbox assembly to input power into the gearbox assembly. In particular, the gearbox efficiency is the ratio of the output power through the output shaft to the input power from the input shaft. In some embodiments, the input shaft is a shaft of the turb-engine (e.g., a low-pressure shaft) and the output shaft is a propulsor shaft of the propulsor.

As used herein, the terms "low," "mid" (or "mid-level"), and "high," or their respective comparative degrees (e.g., "lower" and "higher", where applicable), when used with compressor, combustor, turbine, shaft, propulsor, or turbofan engine components, each refers to relative pressures, relative speeds, relative temperatures, or relative power outputs within a turbine engine unless otherwise specified. For example, a "low-power" setting defines the turbine engine, or the combustor, configured to operate at a power output lower than a "high-power" setting of the turbine engine or the combustor, and a "mid-level power" setting defines the turbine engine, or the combustor, configured to operate at a power output higher than a "low-power" setting and lower than a "high-power" setting. The terms "low," "mid" (or "mid-level") or "high" may additionally, or alternatively, be relative to minimum allowable speeds, pressures, or temperatures. The terms "low," "mid" (or "mid-level") or "high" may be understood to be relative to minimum or maximum allowable speeds, pressures, or temperatures relative to normal, desired, steady state, etc., operation of the turbine engine. A mission cycle for a turbine engine includes, for example, a low-power operation, a mid-power operation, and a high-power operation. Low-power operation includes, for example, engine start, idle, taxiing, and approach. Mid-power operation includes, for example, cruise. High-power operation includes, for example, takeoff and climb.

The various power levels of the turbofan engine are defined as a percentage of a sea level static (SLS) maximum engine rated thrust. Low-power operation includes, for example, less than thirty percent (30%) of the SLS maximum engine rated thrust of the turbine engine. Mid-power operation includes, for example, thirty percent (30%) to eighty-five percent (85%) of the SLS maximum engine rated thrust of the turbine engine. High-power operation includes, for example, greater than eighty-five percent (85%) of the SLS maximum engine rated thrust of the turbine engine. The values of the thrust for each of the low-power operation, the mid-power operation, and the high-power operation of the turbine engine are exemplary only, and other values of the thrust can be used to define the low-power operation, the mid-power operation, and the high-power operation.

As used herein, a "design point operating condition" is an operating condition that is selected to design the gearbox lubrication system (e.g., mass flow rate of the lubricant and the temperature of the lubricant) for a particular sizing of the gearbox assembly.

As used herein, a "particular operating condition" is an operating condition used for comparing one or more variables at the particular operating condition to the one or more variables at the design point operating condition. The particular operating condition can be any one of the low-power operation, the mid-power operation, or the high-power operation.

For example, the high-power operation can be used as the design point operating condition and one of the low-power operation, the mid-power operation, or the high-power operation can be used as the particular operating condition.

The ranges disclosed herein are valid for the design point operating condition and the particular operating condition being the same or being different.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A gear assembly for a turbine engine or other applications is used to transmit power and motion from one rotating component to another rotating component. For example, a turbine engine can include a gearbox assembly that transmits power from a shaft of a turbo-engine to a propulsor of the turbine engine. Rotating parts (e.g., the gears), however, are not one hundred percent (100%) efficient. During operation of the gear assembly, the gears and the bearings generate power losses due to friction (F) (e.g., between the gear teeth of the gears) and interaction of the rotating components with the fluids (e.g., lubricant) inside the gear assembly. The interaction of the rotating components with the fluids is referred to as windage (W) and is caused by drag of the rotating component within the fluids. The friction and the windage produce heat within the gear assembly that needs to be dissipated. Lubricant, such as, by way of a non-limiting example, oil, can be used to lubricate and to cool the gear assembly components (e.g., the gears and the bearings) through dedicated lubricant streams directed to the bearings and the meshing points of the gears.

The amount of lubricant needed in the lubrication system for lubricating the gears or the bearings is determined based on a maximum delta temperature (dT) that each component can sustain before becoming damaged (e.g., gear scuffing). For example, the maximum delta temperature (dT) is based on the material properties of the components, as well as the amount of power losses from friction and windage (e.g., fluidic losses) that heat up (e.g., increase the temperature of) the components. Using more lubricant in the lubrication system results in lower dT and lower damage to the gears and to the bearings. However, the greater amount of lubricant flow through the lubrication system results in greater fluidic losses such that the efficiency of the gearbox is reduced. In particular, the friction and the windage from the lubricant on the gears causes the output torque to reduce for a same power output level as compared to if there is less lubricant in the lubrication system. Using less lubricant in the lubrication system results in greater efficiency due to lesser fluidic losses, but higher dT and higher risk of damage to the gears and to the bearings.

Further, the amount of lubricant through the lubrication system varies during a typical power cycle of the turbine engine. In turbine engines for aircraft, in particular, the lubricant flow is less during low-power conditions (e.g., idle, taxiing, etc.) and greater during mid-power conditions (e.g., cruise), and even greater during high-power conditions (e.g., takeoff or climb). Typically, the amount of lubricant in the lubrication system is determined based on lubricant requirements during high-power operation. Because of this, the amount of lubricant provided to the gearbox is not optimized (e.g., reducing the dT, while maintaining efficiency of the gearbox) for the low-power conditions and the mid-power conditions. Accordingly, there is more lubricant than needed to reduce the dT, to reduce the damage to the gears and the bearings, and, thus, the gearbox efficiency is reduced during the low-power conditions and the mid-power conditions.

The inventors, seeking a need to find a solution to this problem, designed and tested several different turbine engine architectures in an effort to arrive at a lubrication system that met both the dT and damage, as well as the efficiency requirements for the gearbox assembly during an entire operating cycle (e.g., low-power conditions, mid-power conditions, and high-power conditions) of the turbine engine.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a propulsor section 14 and a turbo-engine 16 disposed downstream from the propulsor section 14.

The turbo-engine 16 includes, in serial flow relationship, a compressor section 21, a combustion section 26, and a turbine section 27. The turbo-engine 16 is substantially enclosed within an outer casing 18 that is substantially tubular and defines a core inlet 20 that is annular about the longitudinal centerline axis 12. As schematically shown in FIG. 1, the compressor section 21 includes a booster or a low-pressure (LP) compressor 22 followed downstream by a high-pressure (HP) compressor 24. The combustion section 26 is downstream of the compressor section 21. The turbine section 27 is downstream of the combustion section 26 and includes a high-pressure (HP) turbine 28 followed downstream by a low-pressure (LP) turbine 30. The turbo-engine 16 further includes a jet exhaust nozzle section 32 that is downstream of the turbine section 27, a high-pressure (HP) shaft 34, and a low-pressure (LP) shaft 36. The HP shaft 34 drivingly connects the HP turbine 28 to the HP compressor 24. The HP turbine 28 and the HP compressor 24 rotate in unison through the HP shaft 34. The LP shaft 36 drivingly connects the LP turbine 30 to the LP compressor 22. The LP turbine 30 and the LP compressor 22 rotate in unison through the LP shaft 36. The compressor section 21, the combustion section 26, the turbine section 27, and the jet exhaust nozzle section 32 together define a core air flow path.

For the embodiment depicted in FIG. 1, the propulsor section 14 includes a propulsor 38 (e.g., a variable pitch propulsor) having a plurality of propulsor blades 40 coupled to a disk 42 in a spaced apart manner. In the embodiment of FIG. 1, the propulsor 38 is a fan that is driven by the turbo-engine 16. In some embodiments, the propulsor 38 is a propeller that is driven by the turbo-engine 16. The propulsor blades 40 extend outwardly from the disk 42 generally along the radial direction R. In the case of a variable pitch propulsor, the plurality of propulsor blades 40 is rotatable relative to the disk 42 about a pitch axis P by virtue of the propulsor blades 40 being operatively coupled to an actuation member 44 configured to collectively vary the pitch of the propulsor blades 40 in unison. The propulsor blades 40, the disk 42, and the actuation member 44 are together rotatable about the longitudinal centerline axis 12 via a propulsor shaft 45 that is powered by the LP shaft 36 across a power gearbox, also referred to as a gearbox assembly 46. In this way, the propulsor 38 is drivingly coupled to, and powered by, the turbo-engine 16, and the turbine engine 10 is an indirect drive engine. The gearbox assembly 46 is shown schematically in FIG. 1. The gearbox assembly 46 is a reduction gearbox assembly for adjusting the rotational speed of the propulsor shaft 45 and, thus, the propulsor 38 relative to the LP shaft 36 when power is transferred from the LP shaft 36 to the propulsor shaft 45.

Referring still to the exemplary embodiment of FIG. 1, the disk 42 is covered by a propulsor hub 48 that is aerodynamically contoured to promote an airflow through the plurality of propulsor blades 40. In addition, the propulsor section 14 includes an annular propulsor casing or a nacelle 50 that circumferentially surrounds the propulsor 38 and at least a portion of the turbo-engine 16. The nacelle 50 is supported relative to the turbo-engine 16 by a plurality of outlet guide vanes 52 that is circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the propulsor section 14. As the volume of air 58 passes across the propulsor blades 40, a first portion of air, also referred to as bypass air 62 is routed into the bypass airflow passage 56, and a second portion of air, also referred to as core air 64, is routed into the upstream section of the core air flow path through the core inlet 20 of the LP compressor 22. The pressure of the core air 64 is then increased, generating compressed air 65. The compressed air 65 is routed through the HP compressor 24 and into the combustion section 26, where the compressed air 65 is mixed with fuel and ignited to generate combustion gases 66.

The combustion gases 66 are routed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 (self-sustaining cycle). In this way, the combustion gases 66 do work on the HP turbine 28. The combustion gases 66 are then routed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the propulsor 38 via the gearbox assembly 46. In this way, the combustion gases 66 do work on the LP turbine 30.

The combustion gases 66 are subsequently routed through the jet exhaust nozzle section 32 of the turbo-engine 16 to provide propulsive thrust. Simultaneously, the bypass air 62 is routed through the bypass airflow passage 56 before being exhausted from a propulsor nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

A controller 90 is in communication with the turbine engine 10 for controlling aspects of the turbine engine 10. For example, the controller 90 is in two-way communication with the turbine engine 10 for receiving signals from various sensors and control systems of the turbine engine 10 and for controlling components of the turbine engine 10, as detailed further below. The controller 90, or components thereof, may be located onboard the turbine engine 10, onboard the aircraft, or can be located remote from each of the turbine engine 10 and the aircraft. The controller 90 can be a Full Authority Digital Engine Control (FADEC) that controls aspects of the turbine engine 10.

The controller 90 may be a standalone controller or may be part of an engine controller to operate various systems of the turbine engine 10. In this embodiment, the controller 90 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 90 to perform operations. The controller 90 and, more specifically, the one or more processors are programmed or configured to perform these operations, such as the operations discussed further below. In some embodiments, the instructions can be executed by the one or more processors to cause the one or more processors to complete any of the operations and functions for which the controller 90 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the propulsor 38 may be configured in any other suitable manner (e.g., as a fixed pitch propulsor) and further may be supported using any other suitable propulsor frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, or turboprop engines.

Figure 2:
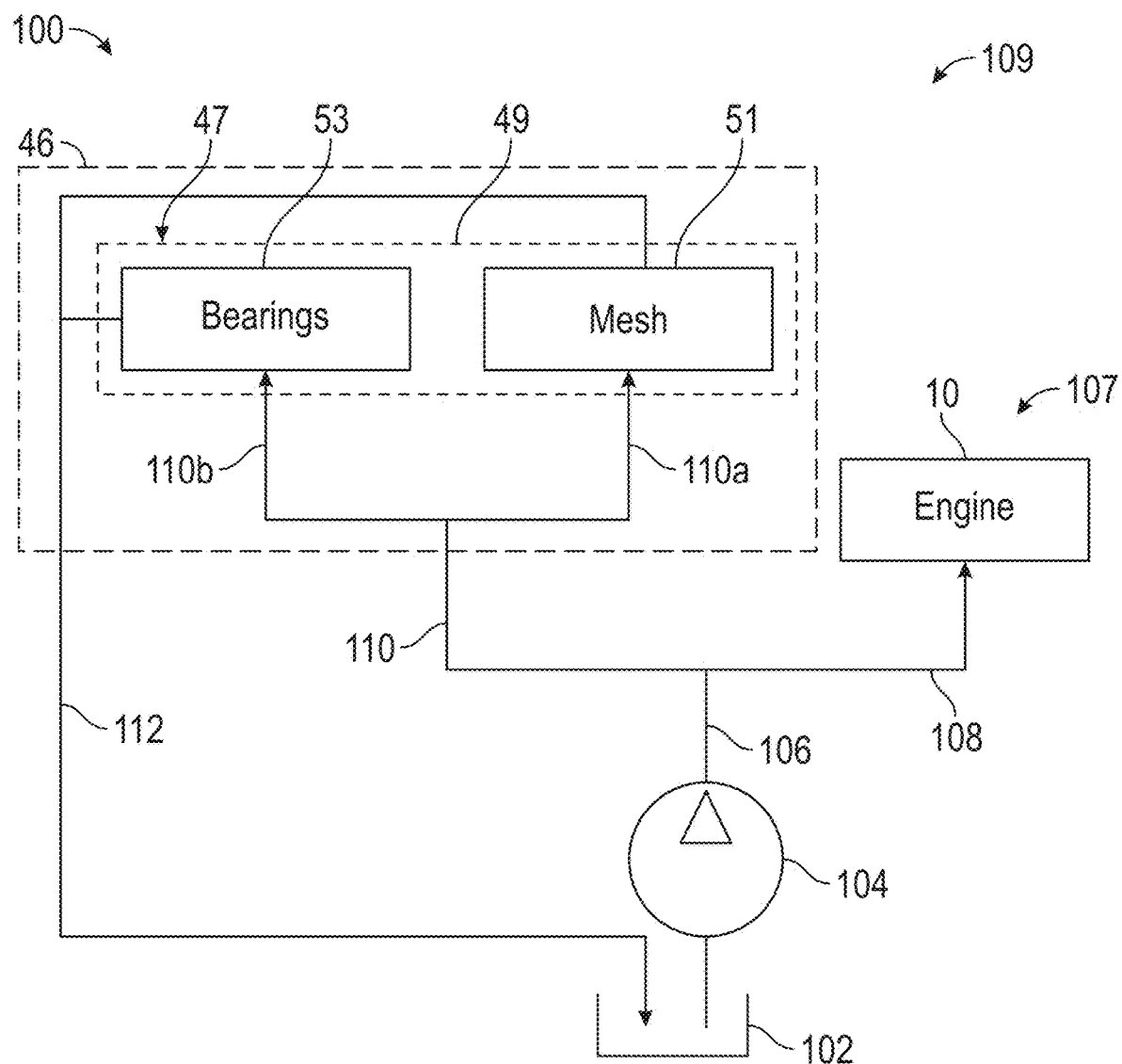
FIG. 2 is a schematic diagram of a lubrication system for the turbine engine of FIG. 1, according to the present disclosure.

FIG. 2 is a schematic diagram of a lubrication system 100 for the turbine engine 10, according to the present disclosure. As shown in FIG. 2, the gearbox assembly 46 includes a gear assembly 47 having a plurality of gears 49. An exemplary gear assembly 47 is illustrated and detailed in FIGS. 3A and 3B below. The plurality of gears 49 intermesh with each other at a mesh 51. At least one of the plurality of gears 49 includes one or more bearings 53 disposed within the at least one of the plurality of gears 49 such that the at least one of the plurality of gears 49 rotates with respect to the one or more bearings 53. In this embodiment, the one or more bearings 53 are roller bearings.

The lubrication system 100 includes a lubricant supply 102, a lubricant pump 104, and one or more lubricant supply lines 106. The lubricant supply 102 includes a lubricant tank or a sump for storing lubricant (e.g., oil) therein and supplies the lubricant to the turbine engine 10 or the gearbox assembly 46 through the one or more lubricant supply lines 106. The lubricant pump 104 is in fluid communication with the lubricant supply 102 and the one or more lubricant supply lines 106. The lubrication system 100 includes a turbine engine lubrication system 107 and a gearbox lubrication system 109.

Figure 8:
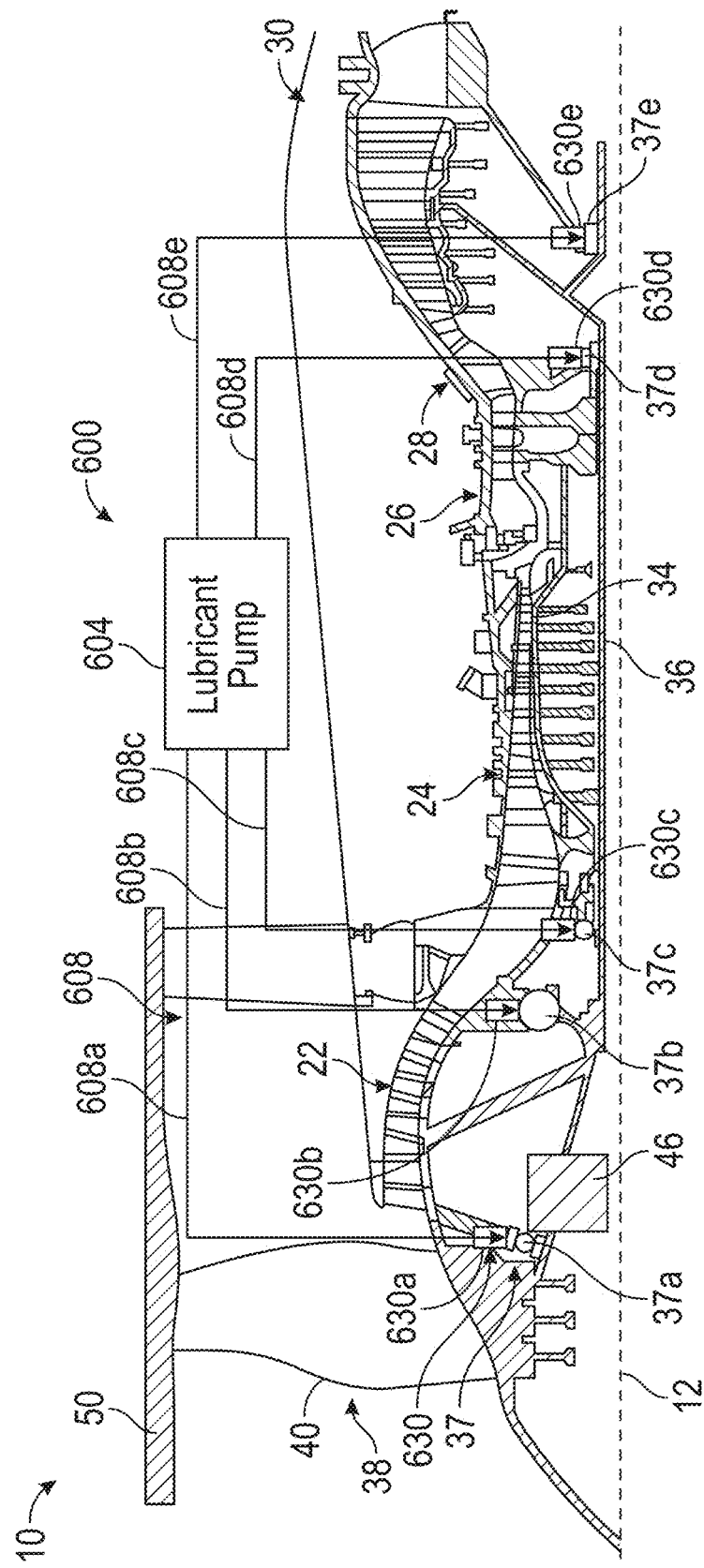
FIG. 8 is a schematic diagram of a lubrication system for the turbine engine of FIG. 1, according to another embodiment.
Figure 9:
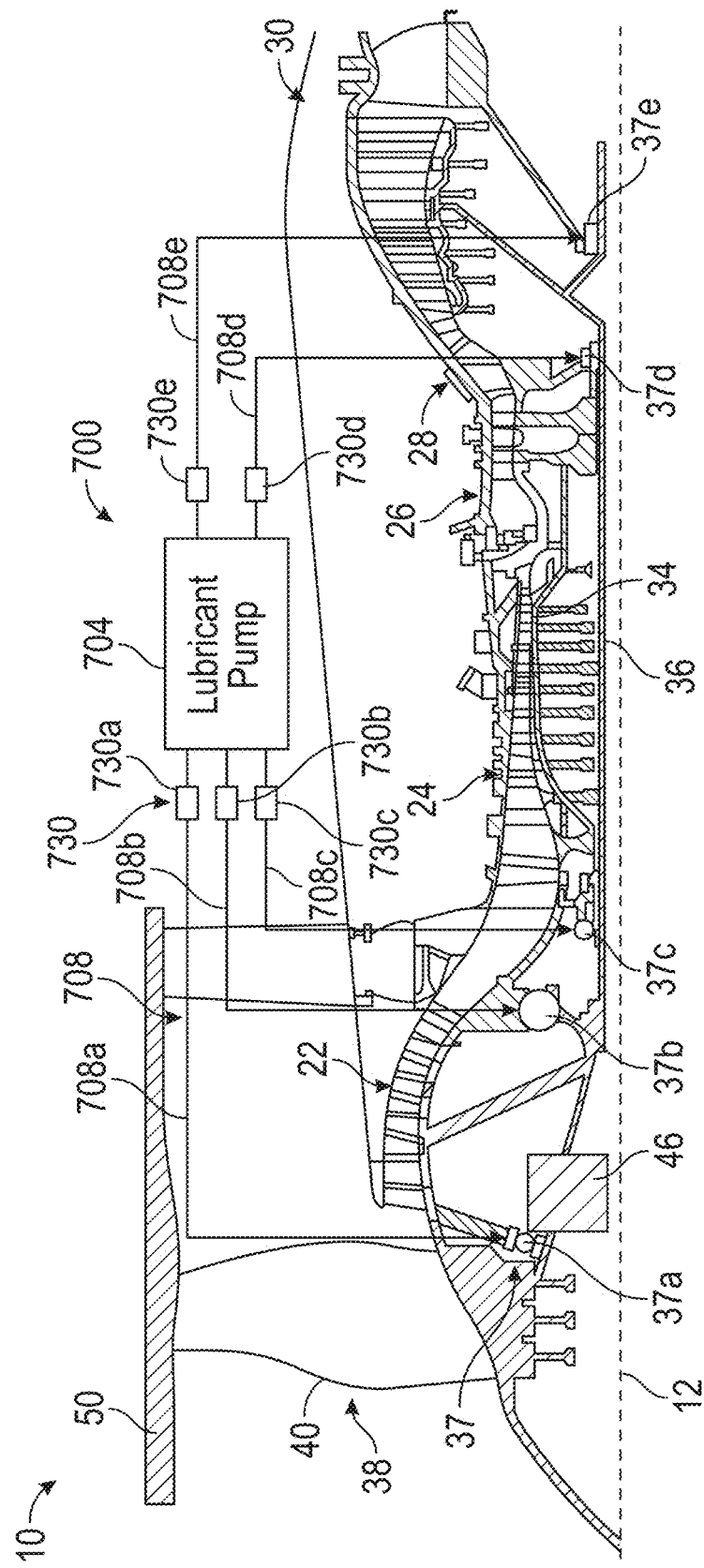
FIG. 9 is a schematic diagram of a lubrication system for the turbine engine of FIG. 1, according to another embodiment.

The turbine engine lubrication system 107 supplies the lubricant to one or more rotating components of the turbine engine 10. The one or more rotating components include at least one of the HP shaft 34 (FIG. 1), the LP shaft 36 (FIG. 1), or one or more turbine engine bearings 37 (FIGS. 8 and 9). The turbine engine lubrication system 107 includes one or more turbine engine lubricant supply lines 108 in fluid communication with the one or more lubricant supply lines 106 and the one or more rotating components of the turbine engine 10 for supplying the lubricant to the one or more rotating components from the lubricant supply 102. In some embodiments, the one or more turbine engine lubricant supply lines 108 are fluidly coupled to the one or more lubricant supply lines 106. In some embodiments, the one or more turbine engine lubricant supply lines 108 embody a portion of the one or more lubricant supply lines 106 (e.g., as branches of the one or more lubricant supply lines 106).

The gearbox lubrication system 109 supplies the lubricant to the gearbox assembly 46 for lubricating the gear assembly 47. In particular, the gearbox lubrication system 109 supplies the lubricant to at least one of the mesh 51 or the bearings 53 of the gears 49. The gearbox lubrication system 109 includes one or more gearbox lubricant supply lines 110 in fluid communication with the one or more lubricant supply lines 106 and the gearbox assembly 46 for supplying the lubricant to the gearbox assembly 46 from the lubricant supply 102. In some embodiments, the one or more gearbox lubricant supply lines 110 are fluidly coupled to the one or more lubricant supply lines 106. In some embodiments, the one or more gearbox lubricant supply lines 110 embody a portion of the one or more lubricant supply lines 106 (e.g., as branches of the one or more lubricant supply lines 106). The one or more gearbox lubricant supply lines 110 include a first gearbox lubricant supply line 110a and a second gearbox lubricant supply line 110b. The first gearbox lubricant supply line 110a is in fluid communication with the mesh 51 for supplying the lubricant to the mesh 51. The second gearbox lubricant supply line 110b is in fluid communication with the bearings 53 for suppling the lubricant to the bearings 53. The gearbox lubrication system 109 also includes a gearbox lubricant return line 112 in fluid communication with the gearbox assembly 46 and the lubricant supply 102 for returning the lubricant that drains from the gear assembly 47 (e.g., the mesh 51 or the bearings 53) to the lubricant supply 102.

In operation, the lubricant pump 104 pumps the lubricant from the lubricant supply 102 to the one or more rotating components of the turbine engine 10 or to the gearbox assembly 46 through the one or more lubricant supply lines 106 for lubricating the one or more rotating components or the gear assembly 47. In particular, the one or more turbine engine lubricant supply lines 108 direct the lubricant to the one or more rotating components. The one or more gearbox lubricant supply lines 110 direct the lubricant to the gear assembly 47 (e.g., to the mesh 51 through the first gearbox lubricant supply line 110a or to the bearings 53 through the second gearbox lubricant supply line 110b). The lubrication system 100 supplies the lubricant to the turbine engine 10 or to the gearbox assembly 46 at a mass flow rate. In the embodiment of FIG. 2, the mass flow rate is linear with the lubricant pump 104 speed during the entire operating cycle of the turbine engine 10. In this way, the mass flow rate increases linearly with increasing lubricant pump 104 speed and decreases linearly with decreasing lubricant pump 104 speed.

The lubricant drains from the gear assembly 47 into the gearbox lubricant return line 112. The gearbox lubricant return line 112 directs the lubricant back to the lubricant supply 102. For example, the lubricant pump 104 (or a separate pump) pumps the lubricant through the gearbox lubricant return line 112 and re-circulates the lubricant to the lubricant supply 102. In this way, the lubricant can be re-used to lubricate the plurality of gears 49 of the gear assembly 47 (e.g., the mesh 51), the bearings 53, other components of the gearbox assembly 46, or the rotating components of the turbine engine 10.

Figure 3A:
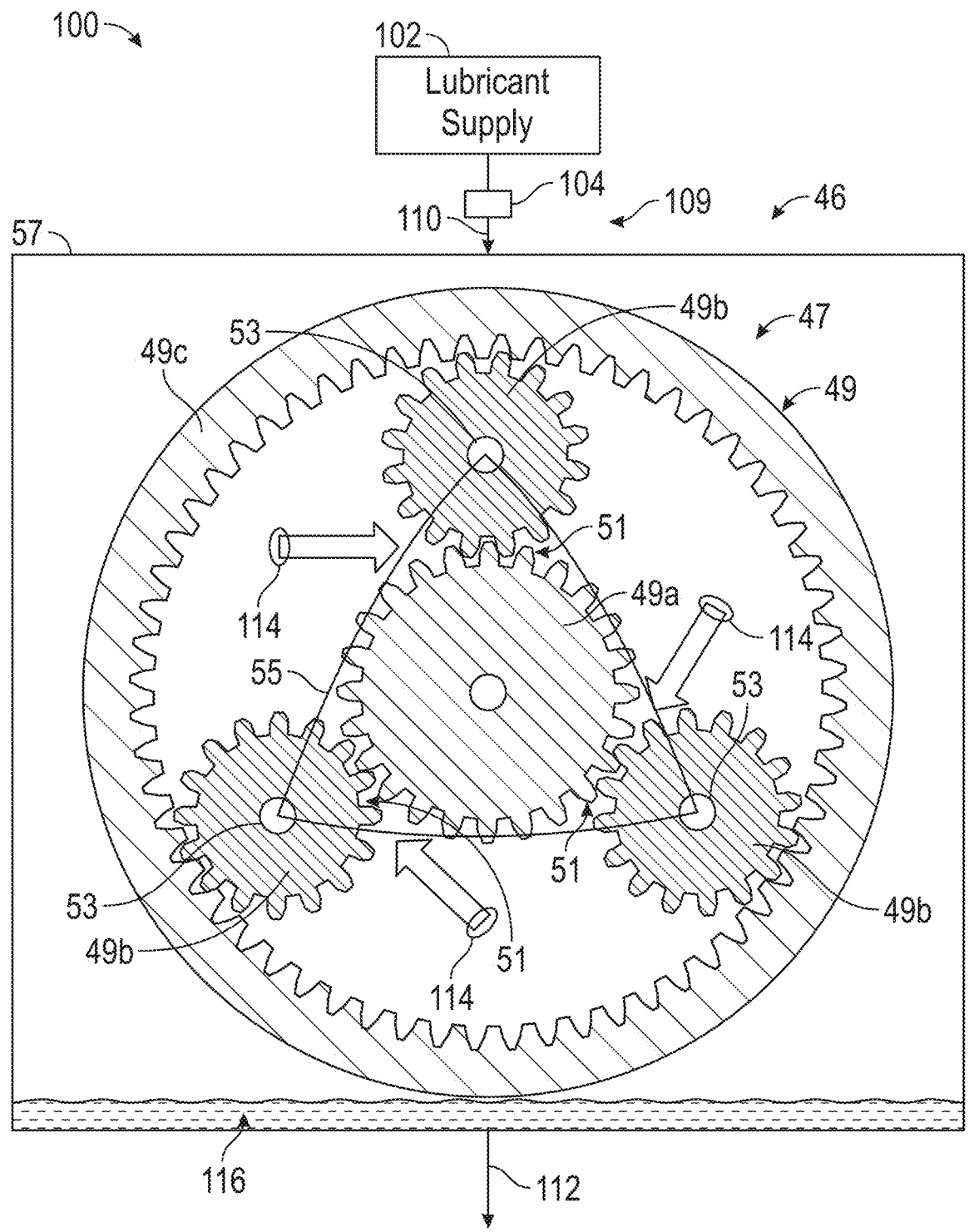
FIG. 3A is a schematic, axial end, cross-sectional view of a gearbox assembly and a portion of the lubrication system, taken at detail 3A-3A in FIG. 1, according to the present disclosure.

FIG. 3A is a schematic, axial end, cross-sectional view of the gearbox assembly 46 and a portion of the lubrication system 100, taken at detail 3A-3A in FIG. 1, according to the present disclosure. As shown in FIG. 3A, the gearbox assembly 46 includes a housing 57 (e.g., shown schematically in FIG. 3A) and the gear assembly 47 is disposed within the housing 57.

The plurality of gears 49 of the gear assembly 47 includes a first gear 49a, a plurality of second gears 49b, and a third gear 49c. In FIG. 3A, the first gear 49a is a sun gear, the second gears 49b are planet gears, and the third gear 49c is a ring gear. The gear assembly 47 is a star type or a rotating ring gear type gear assembly (e.g., the third gear 49c is rotating and a planet carrier 55 (shown schematically in FIG. 3A) is fixed and stationary). In such an arrangement, the propulsor 38 (FIG. 1) is driven by the third gear 49c. In this way, the third gear 49c is an output of the gear assembly 47.

An input shaft is coupled to the first gear 49a. The input shaft is coupled to the turbine section 27 (FIG. 1) of the turbine engine 10. For example, the LP shaft 36 (FIG. 1) is the input shaft. In some embodiments, the HP shaft 34 (FIG. 1) is the input shaft. Radially outward of the first gear 49a, and intermeshing therewith, is the plurality of second gears 49b that is coupled together and supported by the planet carrier 55 (shown schematically). The first gear 49a and a respective second gear 49b are intermeshed at the mesh 51. The planet carrier 55 supports and constrains the plurality of second gears 49b such that the plurality of second gears 49b is enabled to rotate about its own corresponding axis without rotating about the periphery of the first gear 49a. Radially outwardly of the plurality of second gears 49b, and intermeshing therewith, is the third gear 49c, which is an annular ring gear. The third gear 49c is coupled via an output shaft to the propulsor 38 (FIG. 1) and rotates to drive rotation of the propulsor 38 (FIG. 1) about the longitudinal centerline axis 12. For example, the propulsor shaft 45 is the output shaft.

In operation, the input shaft (e.g., the LP shaft 36 or the HP shaft 34) rotates and causes the first gear 49a to rotate. The first gear 49a, being intermeshed with the plurality of second gears 49b at the mesh 51, causes the plurality of second gears 49b to rotate. The bearings 53 are disposed within the plurality of second gears 49b and are coupled to the planet carrier 55 such that the plurality of second gears 49b rotates with respect to the bearings 53. The plurality of second gears 49b, being intermeshed with the third gear 49c, causes the third gear 49c to rotate, and, thus, the third gear 49c causes the output shaft (e.g., the propulsor shaft 45) to rotate.

As shown in FIG. 3A, the gearbox lubrication system 109 includes one or more gearbox lubricant injectors 114 and a sump 116. The gearbox lubricant injectors 114 are in fluid communication with the gearbox lubricant supply lines 110 to inject the lubricant to the gear assembly 47. In particular, the gearbox lubricant injectors 114 are positioned to inject the lubricant to at least one of the mesh 51 or the lubricant to the bearings 53. For example, one or more of the gearbox lubricant injectors 114 can be positioned to inject the lubricant to the mesh 51 and one or more of the gearbox lubricant injectors 114 can be positioned to inject the lubricant to the bearings 53.

The sump 116 is a reservoir within the housing 57 that collects the lubricant that drains from the gear assembly 47 or from the bearings 53 of the gear assembly 47. The sump 116 is in fluid communication with the gearbox lubricant return line 112 for draining the lubricant from the sump 116. In this way, the gearbox lubrication system 109 includes the sump 116.

Figure 3B:
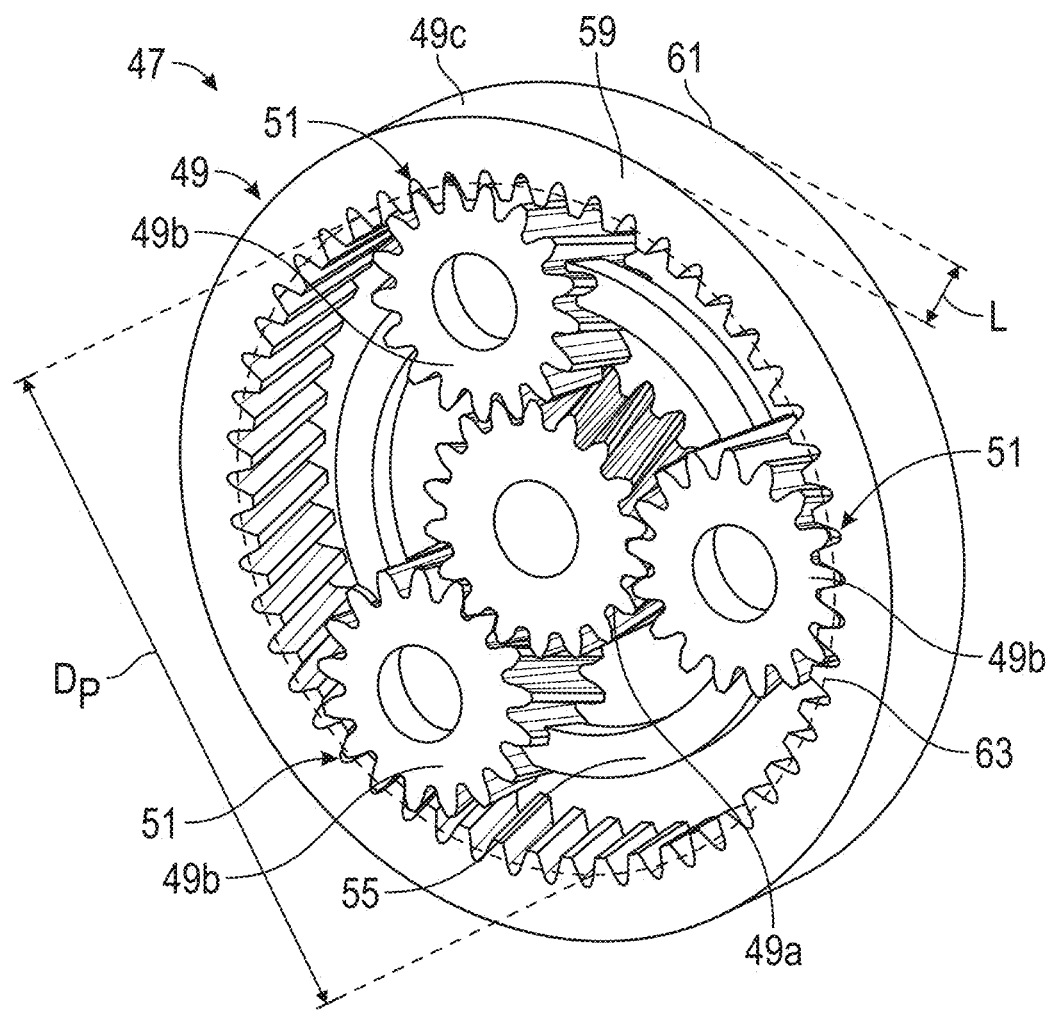
FIG. 3B shows a gear assembly isolated from the gearbox assembly of FIG. 3A, according to the present disclosure.

FIG. 3B shows the gear assembly 47 isolated from the gearbox assembly 46, according to the present disclosure. As shown in FIG. 3B, the gears 49 of the gear assembly 47 have a first axial face 59 and a second axial face 61 and extend axially from the first axial face 59 to the second axial face 61. The gear assembly 47 has a gearbox axial length L that is defined as an axial length (in the axial direction) of the third gear 49c from the first axial face 59 to the second axial face 61. The gear assembly 47 has a pitch diameter $D_P$. The pitch diameter $D_P$ is a diameter of a pitch circle 63 of the third gear 49c. The pitch circle 63 is defined as an imaginary circle that intersects the teeth of the third gear 49c and the teeth of the second gears 49b at the mesh 51 of the third gear 49c with the second gears 49b. In particular, the pitch circle 63 is located at an average diameter between a tooth peak and a tooth valley of the third gear 49c and the second gears 49b at which there is no sliding between the teeth of the third gear 49c and the teeth of the second gears 49b. The gearbox assembly 46 has a gearbox volume that is equal to $((\pi D_P^2 * L)/4)$. In this way, the gearbox volume is a volume of the space taken up by the gear assembly 47.

Figure 4:
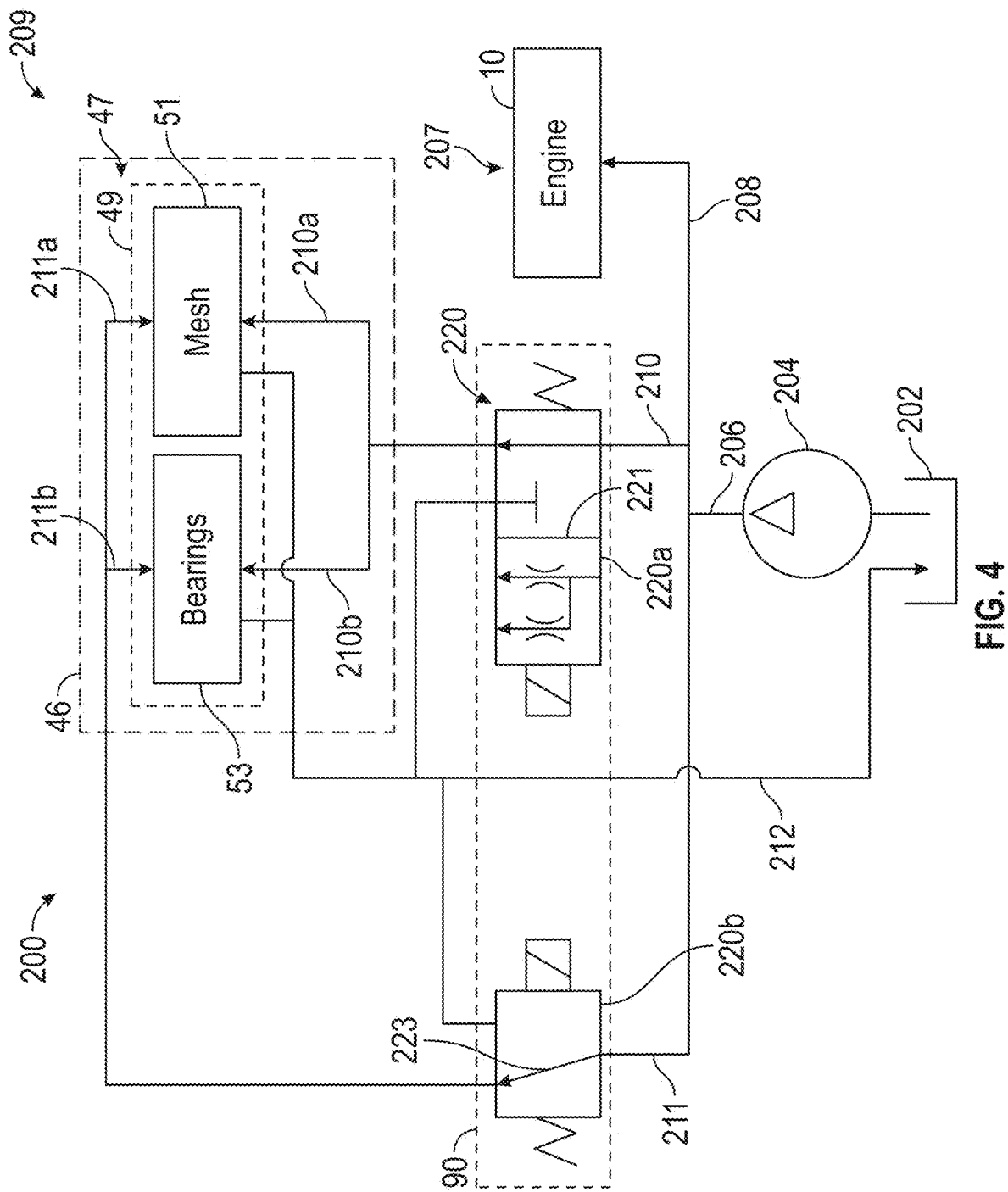
FIG. 4 is a schematic diagram of a lubrication system for the turbine engine of FIG. 1, according to another embodiment.

FIG. 4 is a schematic diagram of a lubrication system 200 for the turbine engine 10, according to another embodiment. The lubrication system 200 is substantially similar to the lubrication system 100 of FIG. 2. The same reference numerals or similar reference numerals will be used for components of the lubrication system 200 that are the same as or similar to the components of the lubrication system 100 discussed above. The description of these components above also applies to this embodiment, and a detailed description of these components is omitted here.

The lubrication system 200 includes a lubricant supply 202, a lubricant pump 204, one or more lubricant supply lines 206, a turbine engine lubrication system 207, and a gearbox lubrication system 209. The turbine engine lubrication system 207 includes one or more turbine engine lubricant supply lines 208. The turbine engine lubrication system 207 can also include a turbine engine lubricant return line (not shown) for returning the lubricant to the lubricant supply 102. The gearbox lubrication system 209 includes one or more primary gearbox lubricant supply lines 210 and a gearbox lubricant return line 212. The one or more primary gearbox lubricant supply lines 210 include a first primary gearbox lubricant supply line 210a to the mesh 51 and a second primary gearbox lubricant supply line 210b to the bearings 53.

The gearbox lubrication system 209 includes one or more auxiliary gearbox lubricant supply lines 211 in fluid communication with gearbox assembly 46 for supplying the lubricant to the gearbox assembly 46 for lubricating the gear assembly 47. The one or more auxiliary gearbox lubricant supply lines 211 include a first auxiliary gearbox lubricant supply line 211a in fluid communication with the mesh 51 and a second auxiliary gearbox lubricant supply line 211b in fluid communication with the bearings 53.

The gearbox lubrication system 209 includes one or more valves 220 disposed in the one or more lubricant supply lines 206 for modulating a flow of the lubricant to the gearbox assembly 46. In particular, the one or more valves 220 includes a first valve 220a and a second valve 220b. The first valve 220a is in fluid communication with the primary gearbox lubricant supply lines 210. The second valve 220b is in fluid communication with the auxiliary gearbox lubricant supply lines 211.

The first valve 220a is a proportional modulating valve (PMV) that includes a first valve member 221 that moves between a fully opened positioned and a fully closed position to modulate the flow of the lubricant through the primary gearbox lubricant supply lines 210. The first valve 220a is in communication with the controller 90 such that the controller 90 controls the first valve 220a to move the first valve member 221 between the fully opened position and the fully closed position, as detailed further below. In the fully opened position, the first valve 220a allows the lubricant to fully flow through the primary gearbox lubricant supply lines 210. In the fully closed position, the first valve 220a prevents the lubricant from flowing through the primary gearbox lubricant supply lines 210. The first valve 220a can move the first valve member 221 anywhere between the fully opened position and the fully closed position to modulate the flow of the lubricant through the primary gearbox lubricant supply lines 210.

The second valve 220b is a shut-off valve (SOV) that includes a second valve member 223 that moves between an opened position and a closed position. The second valve 220b is in communication with the controller 90 such that the controller 90 controls the second valve 220b to move the second valve member 223 between the opened position and the closed position. In the opened position, the second valve 220b allows the lubricant to fully flow through the auxiliary gearbox lubricant supply lines 211. In the closed position, the second valve 220b prevents the lubricant from flowing through the auxiliary gearbox lubricant supply lines 211.

The lubrication system 200 operates substantially the same as does the lubrication system 100 of FIG. 2. The lubrication system 200, however, modulates the flow of the lubricant to the gearbox assembly 46. The controller 90 controls the first valve 220a based on at least one of a gearbox inlet pressure (e.g., a pressure of the lubricant at an inlet of the gearbox assembly 46), a turbine engine delivery pressure (e.g., a pressure of the lubricant flowing through the turbine engine lubrication system 207), a turbine engine speed (e.g., a speed of the turbo-engine 16), or a gearbox lubricant temperature (e.g., a temperature of the lubricant in the gearbox assembly 46, for example, in a scavenge reservoir of the gearbox assembly 46). The controller 90 controls the second valve 220b based on at least one of turbine engine power (e.g., a power output from the turbo-engine 16) or a turbine engine speed (e.g., a speed of the turbo-engine 16).

During the high-power operation (e.g., the turbine engine speed or the turbine engine power is greater than a threshold), the first valve 220a is in the fully opened position and the second valve 220b is in the opened position. In this way, the lubricant flows at a first mass flow rate ($\dot{m}_1$) through the primary gearbox lubricant supply lines 210 to the gearbox assembly 46 (e.g., through the first primary gearbox lubricant supply line 210a to the mesh 51 and through the second primary gearbox lubricant supply line 210b to the bearings 53). The first mass flow rate is at a maximum first mass flow rate ($\dot{m}_1$) when the first valve 220a is in the fully opened position. Similarly, the lubricant flows at a second mass flow rate ($\dot{m}_2$) through the auxiliary gearbox lubricant supply lines 211 (through the first auxiliary gearbox lubricant supply line 211a to the mesh 51 and through the second auxiliary gearbox lubricant supply line 211b to the bearings 53). The second mass flow rate ($\dot{m}_2$) is at a maximum when the second valve 220b is in the opened position. In this way, the lubricant flows at a total mass flow rate ($\dot{m}_{total}$) to the gearbox assembly 46 that is a sum of the first mass flow ($\dot{m}_1$) and the second mass flow rate ($\dot{m}_2$). The total mass flow rate ($\dot{m}_{total}$) is at a maximum total mass flow rate when the first valve 220a is in the fully opened position and the second valve 220b is in the opened position.

During low-power operation or mid-power operation (e.g., the turbine engine speed or the turbine engine power is less than a threshold), the first valve 220a is in a partially opened position (e.g., between the fully opened position and the fully closed position) and the second valve 220b is in the closed position. In this way, the first mass flow rate ($\dot{m}_1$) of the lubricant through the primary gearbox lubricant supply lines 210 to the gearbox assembly 46 is less than the maximum first mass flow rate (and greater than zero) in the partially opened position. The second mass flow rate ($\dot{m}_2$) of the lubricant through the auxiliary gearbox lubricant supply lines 211 is zero in the closed position. In this way, the total mass flow rate ($\dot{m}_{total}$) of the lubricant to the gearbox assembly 46 is less than the maximum total mass flow rate. The first valve 220a directs a portion of the lubricant to the lubricant supply 202 and directs a portion of the lubricant to the gearbox assembly 46 through the primary gearbox lubricant supply lines 210 when the first valve 220a is in the partially opened position. The second valve 220b directs the lubricant to the lubricant supply 202 (through the gearbox lubricant return line 212) and prevents the lubricant from flowing to the gearbox assembly 46 through the auxiliary gearbox lubricant supply lines 211 when the second valve 220b is in the closed position. In this way, the total mass flow rate ($\dot{m}_{total}$) of the lubricant to the gearbox assembly 46 is equal to the first mass flow rate ($\dot{m}_1$) when the second valve 220b is in the closed position. The controller 90 can control the first valve 220a to modulate the flow of the lubricant through the primary gearbox lubricant supply lines 210 by moving the first valve member 221 between the fully opened position and the fully closed position during the low-power conditions. In some embodiments, the lubrication system 200 the first valve 220a or the second valve 220b can be excluded. For example, the lubrication system 200 can include only the first valve 220a and not the second valve 220b such that the lubrication system 200 modulates the flow of the lubricant with only the first valve 220a. In some embodiments, the lubrication system 200 can include only the second valve 220b and not the first valve 220a such that the lubrication system 200 modulates the flow of the lubricant with only the second valve 220b.

Figure 5:
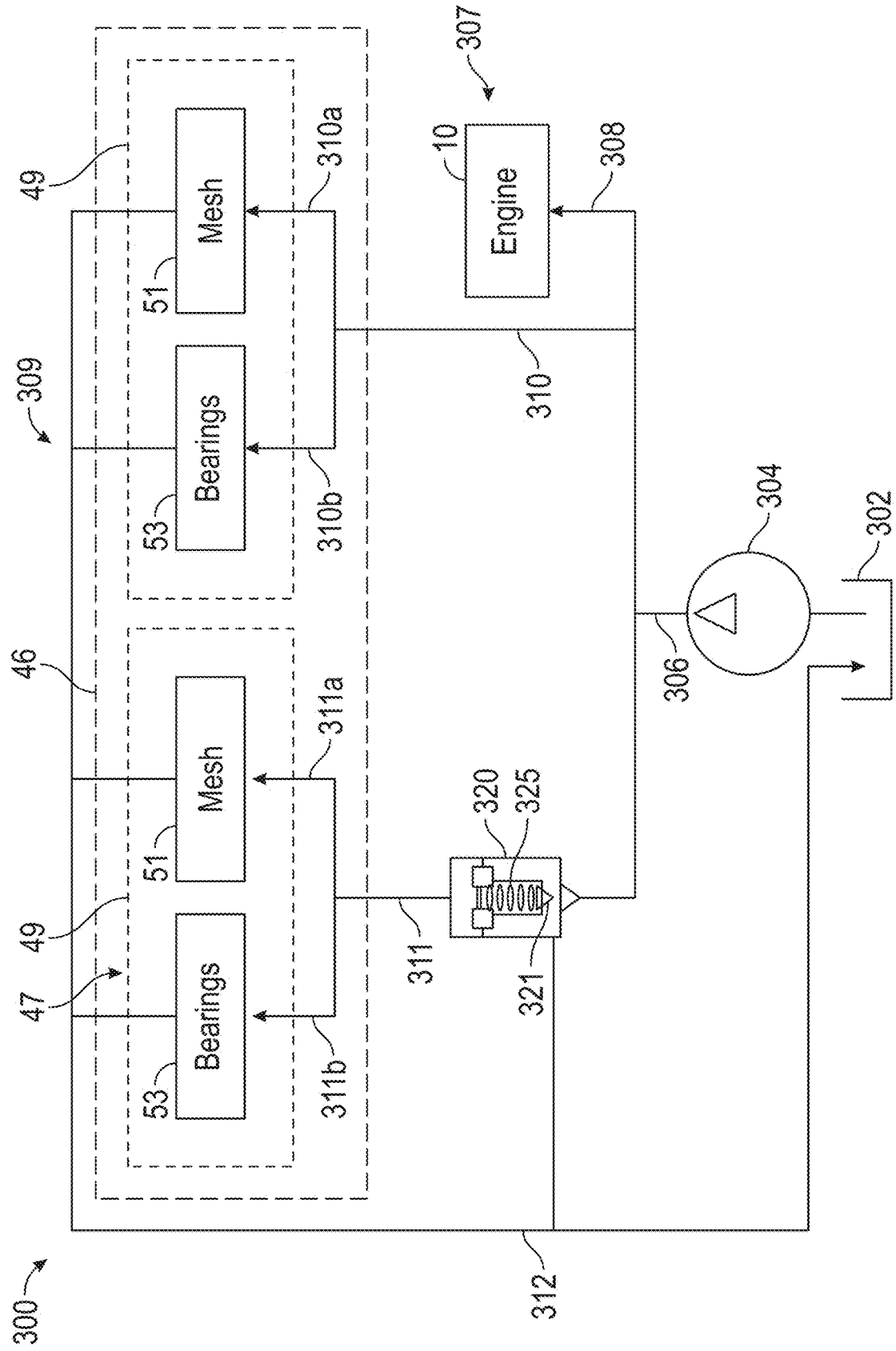
FIG. 5 is a schematic diagram of a lubrication system for the turbine engine of FIG. 1, according to another embodiment.

FIG. 5 is a schematic diagram of a lubrication system 300 for the turbine engine 10, according to another embodiment. The lubrication system 300 is substantially similar to the lubrication system 200 of FIG. 4. The same reference numerals or similar reference numerals will be used for components of the lubrication system 300 that are the same as or similar to the components of the lubrication system 200 discussed above. The description of these components above also applies to this embodiment, and a detailed description of these components is omitted here.

The lubrication system 300 includes a lubricant supply 302, a lubricant pump 304, one or more lubricant supply lines 306, a turbine engine lubrication system 307, and a gearbox lubrication system 309. The turbine engine lubrication system 307 includes one or more turbine engine lubricant supply lines 308. The turbine engine lubrication system 307 can also include a turbine engine lubricant return line for returning the lubricant to the lubricant supply 302. The gearbox lubrication system 309 includes one or more primary gearbox lubricant supply lines 310 and a gearbox lubricant return line 312. The one or more primary gearbox lubricant supply lines 310 include a first primary gearbox lubricant supply line 310a to the mesh 51 (shown redundantly in FIG. 5 for schematic illustration purposes) and a second primary gearbox lubricant supply line 310b to the bearings 53 (shown redundantly in FIG. 5 for schematic illustration purposes).

The gearbox lubrication system 309 includes one or more auxiliary gearbox lubricant supply lines 311 in fluid communication with gearbox assembly 46 for supplying the lubricant to the gearbox assembly 46 for lubricating the gear assembly 47 (shown redundantly in FIG. 5 for schematic illustration purposes). The one or more auxiliary gearbox lubricant supply lines 311 include a first auxiliary gearbox lubricant supply line 311a in fluid communication with the mesh 51 and a second auxiliary gearbox lubricant supply line 311b in fluid communication with the bearings 53.

The gearbox lubrication system 309 includes one or more valves 320 disposed in the one or more lubricant supply lines 306 for modulating a flow of the lubricant to the gearbox assembly 46. In particular, the one or more valves 320 are in fluid communication with the auxiliary gearbox lubricant supply lines 311. The one or more valves 320 are also in fluid communication with the gearbox lubricant return line 312 for returning the lubricant to the lubricant supply 302 when the one or more valves 320 are closed. In some embodiments, the one or more valves 320 can have a valve return line that is separate from the gearbox lubricant return line 312.

The one or more valves 320 include a valve member 321 that moves between a fully opened positioned and a fully closed position to modulate the flow of the lubricant through the auxiliary gearbox lubricant supply lines 311. The one or more valves 320 are passive valves such that the valve member 321 moves based on lubricant pressure of the lubricant in the auxiliary gearbox lubricant supply lines 311. In particular, the one or more valves 320 include a spring 325 that is coupled to the valve member 321 for moving the valve member 321 between a fully opened position and a fully closed position, as detailed further below. Passive valves open and close without being controlled by a controller. The one or more valves 320 can move the valve member 321 anywhere between the fully opened position and the fully closed position to modulate the flow of the lubricant through the auxiliary gearbox lubricant supply lines 311. In some embodiments, the one or more valves 320 can be active valves that are controlled by the controller 90 (FIG. 1).

The lubrication system 300 operates substantially the same as does the lubrication system 200 of FIG. 4. The lubrication system 300, however, modulates the flow of the lubricant to the gearbox assembly 46 passively rather than actively (e.g., without the use of the controller 90).

During the high-power operation (e.g., the lubricant pressure is greater than a lubricant pressure threshold), the primary gearbox lubricant supply lines 310 direct the lubricant to the gearbox assembly 46 at a first mass flow rate ($\dot{m}_1$). The first mass flow rate ($\dot{m}_1$) is linear with the lubricant pump speed and does not modulate. During the high-power operation, the one or more valves 320 are in the fully opened position. In this way, the lubricant flows at a second mass flow rate ($\dot{m}_2$) through the auxiliary gearbox lubricant supply lines 311 to the gearbox assembly 46 (e.g., through the first auxiliary gearbox lubricant supply line 311a to the mesh 51 and through the second auxiliary gearbox lubricant supply line 311b to the bearings 53). The second mass flow rate ($\dot{m}_2$) is at a maximum when the one or more valves 320 are in the fully opened position. In this way, the lubricant flows at a total mass flow rate ($\dot{m}_{total}$) to the gearbox assembly 46 that is a sum of the first mass flow ($\dot{m}_1$) and the second mass flow rate ($\dot{m}_2$). The total mass flow rate ($\dot{m}$total) is at a maximum total mass flow rate when the one or more valves 320 are in the fully opened position. The lubricant pressure of the lubricant in the auxiliary gearbox lubricant supply lines 311 pushes the valve member 321 and causes the spring 325 to retract, to open the valve member 321 to the fully opened position during the high-power operation.

During low-power operation or mid-power operation (e.g., the lubricant pressure is less than a lubricant pressure threshold), the one or more valves 320 are in a partially opened position (e.g., between the fully opened position and the fully closed position). In this way, the second mass flow rate ($\dot{m}_2$) of the lubricant through the auxiliary gearbox lubricant supply lines 311 to the gearbox assembly 46 is less than the maximum second mass flow rate (and greater than zero) in the partially opened position. In this way, the total mass flow rate ($\dot{m}$total) of the lubricant to the gearbox assembly 46 is less than the maximum total mass flow rate. The valve member 321 can move to modulate the flow of the lubricant through the auxiliary gearbox lubricant supply lines 311 between the fully opened position and the fully closed position during the low-power conditions or the mid-power operations. In the fully closed position, the one or more valves 320 direct the lubricant to the lubricant supply 302 through the gearbox lubricant supply line 312. The spring 325 extends to move the valve member 321 towards the partially opened position during the low-power operation or the mid-power operation.

Figure 6:
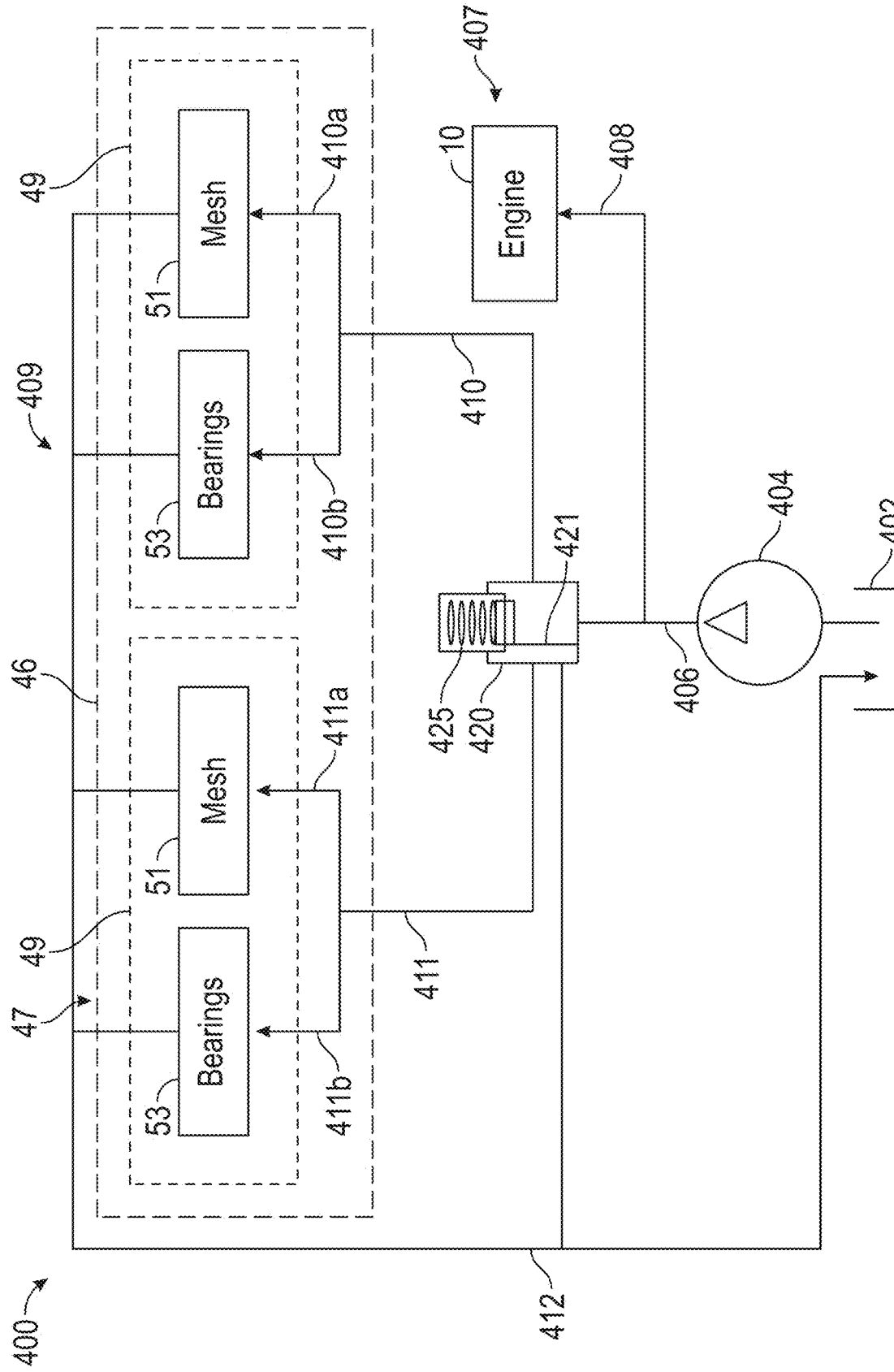
FIG. 6 is a schematic diagram of a lubrication system for the turbine engine of FIG. 1, according to another embodiment.

FIG. 6 is a schematic diagram of a lubrication system 400 for the turbine engine of FIG. 1, according to another embodiment. The lubrication system 400 is substantially similar to the lubrication system 300 of FIG. 5. The same reference numerals or similar reference numerals will be used for components of the lubrication system 400 that are the same as or similar to the components of the lubrication system 300 discussed above. The description of these components above also applies to this embodiment, and a detailed description of these components is omitted here.

The lubrication system 400 includes a lubricant supply 402, a lubricant pump 404, one or more lubricant supply lines 406, a turbine engine lubrication system 407, and a gearbox lubrication system 409. The turbine engine lubrication system 407 includes one or more turbine engine lubricant supply lines 408. The turbine engine lubrication system 407 can also include a turbine engine lubricant return line for returning the lubricant to the lubricant supply 402. The gearbox lubrication system 409 includes one or more primary gearbox lubricant supply lines 410 and a gearbox lubricant return line 412. The one or more primary gearbox lubricant supply lines 410 include a first primary gearbox lubricant supply line 410a to the mesh 51 (shown redundantly in FIG. 6 for schematic illustration purposes) and a second primary gearbox lubricant supply line 410b to the bearings 53 (shown redundantly in FIG. 6 for schematic illustration purposes).

The gearbox lubrication system 409 includes one or more auxiliary gearbox lubricant supply lines 411 in fluid communication with gearbox assembly 46 for supplying the lubricant to the gearbox assembly 46 for lubricating the gear assembly 47 (shown redundantly in FIG. 6 for schematic illustration purposes). The one or more auxiliary gearbox lubricant supply lines 411 include a first auxiliary gearbox lubricant supply line 411a in fluid communication with the mesh 51 and a second auxiliary gearbox lubricant supply line 411b in fluid communication with the bearings 53.

The gearbox lubrication system 409 includes one or more valves 420 disposed in the one or more lubricant supply lines 406 for modulating a flow of the lubricant to the gearbox assembly 46. In particular, the one or more valves 420 are in fluid communication with the primary gearbox lubricant supply lines 410 and the auxiliary gearbox lubricant supply lines 411. The one or more valves 420 are positioned in the lubricant supply lines 406 downstream of the turbine engine lubricant supply lines 408. The one or more valves 420 are also in fluid communication with the gearbox lubricant return line 412 for returning the lubricant to the lubricant supply 402 when the one or more valves 420 are closed. In some embodiments, the one or more valves 420 can have a valve return line that is separate from the gearbox lubricant return line 412.

The one or more valves 420 include a valve member 421 that moves between a fully opened positioned and a fully closed position to modulate the flow of the lubricant through the primary gearbox lubricant supply lines 410 and the auxiliary gearbox lubricant supply lines 411. The one or more valves 420 are three-way valves that receive the lubricant from the lubricant supply lines 406 and modulate the lubricant through the primary gearbox lubricant supply lines 410 and the auxiliary gearbox lubricant supply lines 411.

The one or more valves 420 are passive valves such that the valve member 421 moves based on lubricant pressure of the lubricant in the lubricant supply lines 406. In particular, the one or more valves 420 include a spring 425 that is coupled to the valve member 421 for moving the valve member 421 between the fully opened position and the fully closed position, as detailed further below. The one or more valves 420 can move the valve member 421 anywhere between the fully opened position and the fully closed position to modulate the flow of the lubricant through the primary gearbox lubricant supply lines 410 and the auxiliary gearbox lubricant supply lines 411. The spring 425 is oriented vertically in the embodiment of FIG. 6 such that the valve member 421 moves vertically between the fully opened position and the fully closed position. In some embodiments, the one or more valves 420 can be active valves that are controlled by the controller 90 (FIG. 1).

The lubrication system 400 operates substantially the same as does the lubrication system 300 of FIG. 5. During the high-power operation (e.g., the lubricant pressure is greater than a lubricant pressure threshold), the one or more valves 420 are in the fully opened position. In this way, the lubricant flows at a first mass flow rate ($\dot{m}_1$) through the primary gearbox lubricant supply lines 410 and at a second mass flow rate ($\dot{m}_2$) through the auxiliary gearbox lubricant supply lines 411 to the gearbox assembly 46. The first mass flow rate (mi) and the second mass flow rate ($\dot{m}_2$) are substantially equal. The first mass flow rate ($\dot{m}_1$) and the second mass flow rate ($\dot{m}_2$) are at a maximum when the one or more valves 420 are in the fully opened position. In this way, the lubricant flows at a total mass flow rate ($\dot{m}_{total}$) to the gearbox assembly 46 that is a sum of the first mass flow ($\dot{m}1$) and the second mass flow rate ($\dot{m}_2$). The total mass flow rate ($\dot{m}_{total}$) is at a maximum total mass flow rate when the one or more valves 420 are in the fully opened position. The lubricant pressure of the lubricant in the auxiliary gearbox lubricant supply lines 411 pushes the valve member 421 and causes the spring 425 to retract, to open the valve member 421 to the fully opened position during the high-power operation.

During low-power operation or mid-power operation (e.g., the lubricant pressure is less than a lubricant pressure threshold), the one or more valve 420 are in a partially opened position (e.g., between the fully opened position and the fully closed position). In this way, the first mass flow rate ($\dot{m}_1$) through the primary gearbox lubricant supply line 410 and the second mass flow rate ($\dot{m}_2$) of the lubricant through the auxiliary gearbox lubricant supply lines 411 to the gearbox assembly 46 is less than the maximum first mass flow rate (and greater than zero) and the maximum second mass flow rate (and greater than zero), respectively, in the partially opened position. In this way, the total mass flow rate ($\dot{m}_{total}$) of the lubricant to the gearbox assembly 46 is less than the maximum total mass flow rate. The valve member 421 can move to modulate the flow of the lubricant through the primary gearbox lubricant supply lines 410 and the auxiliary gearbox lubricant supply lines 411 between the fully opened position and the fully closed position during the low-power operations or the mid-power operations. In the fully closed position, the one or more valves 420 direct the lubricant to the lubricant supply 402 through the gearbox lubricant supply line 412. The spring 425 extends to move the valve member 421 towards the partially opened position during the low-power operation or the mid-power operation.

Figure 7:
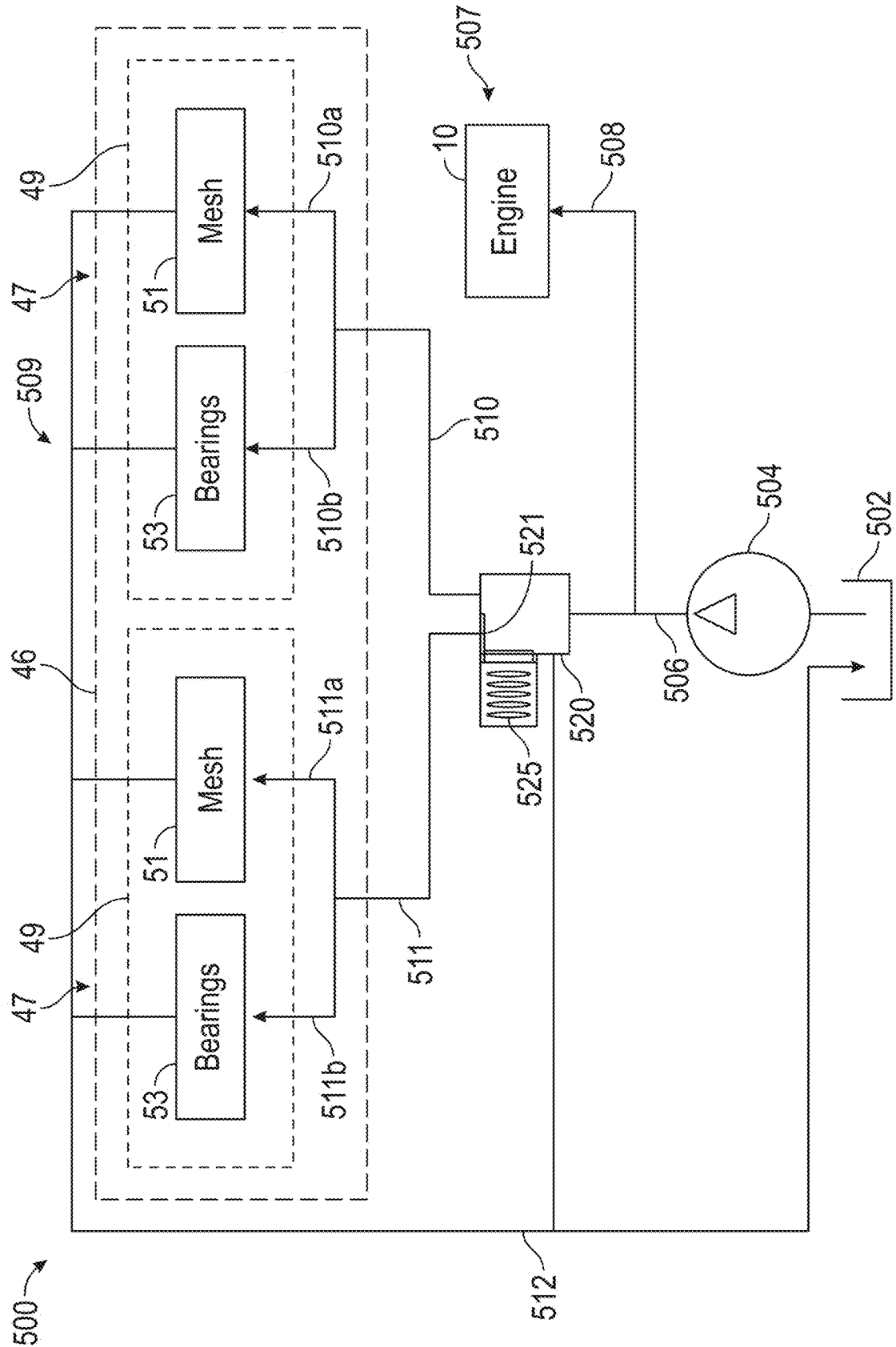
FIG. 7 is a schematic diagram of a lubrication system for the turbine engine of FIG. 1, according to another embodiment.

FIG. 7 is a schematic diagram of a lubrication system 500 for the turbine engine of FIG. 1, according to another embodiment. The lubrication system 500 is substantially similar to the lubrication system 400 of FIG. 6. The same reference numerals or similar reference numerals will be used for components of the lubrication system 500 that are the same as or similar to the components of the lubrication system 400 discussed above. The description of these components above also applies to this embodiment, and a detailed description of these components is omitted here.

The lubrication system 500 includes a lubricant supply 502, a lubricant pump 504, one or more lubricant supply lines 506, a turbine engine lubrication system 507, and a gearbox lubrication system 509. The turbine engine lubrication system 507 includes one or more turbine engine lubricant supply lines 508. The turbine engine lubrication system 507 can also include a turbine engine lubricant return line for returning the lubricant to the lubricant supply 502. The gearbox lubrication system 509 includes one or more primary gearbox lubricant supply lines 510 and a gearbox lubricant return line 512. The one or more primary gearbox lubricant supply lines 510 include a first primary gearbox lubricant supply line 510*a* to the mesh 51 (shown redundantly in FIG. 7 for schematic illustration purposes) and a second primary gearbox lubricant supply line 510*b* to the bearings 53 (shown redundantly in FIG. 7 for schematic illustration purposes).

The gearbox lubrication system 509 includes one or more auxiliary gearbox lubricant supply lines 511 in fluid communication with gearbox assembly 46 for supplying the lubricant to the gearbox assembly 46 for lubricating the gear assembly 47 (shown redundantly in FIG. 7 for schematic illustration purposes). The one or more auxiliary gearbox lubricant supply lines 511 include a first auxiliary gearbox lubricant supply line 511*a* in fluid communication with the mesh 51 and a second auxiliary gearbox lubricant supply line 511*b* in fluid communication with the bearings 53.

The gearbox lubrication system 509 includes one or more valves 520 disposed in the one or more lubricant supply lines 506 for modulating a flow of the lubricant to the gearbox assembly 46. In particular, the one or more valves 520 are in fluid communication with the primary gearbox lubricant supply lines 510 and the auxiliary gearbox lubricant supply lines 511. The one or more valves 520 are positioned in the lubricant supply lines 506 downstream of the turbine engine lubricant supply lines 508. The one or more valves 520 are also in fluid communication with the gearbox lubricant return line 512 for returning the lubricant to the lubricant supply 502 when the one or more valves 520 are closed. In some embodiments, the one or more valves 520 can have a valve return line that is separate from the gearbox lubricant return line 512.

The one or more valves 520 include a valve member 521 that moves between a fully opened positioned and a fully closed position to modulate the flow of the lubricant through the primary gearbox lubricant supply lines 510 and the auxiliary gearbox lubricant supply lines 511. The one or more valves 520 are three-way valves that receive the lubricant from the lubricant supply lines 506 and modulate the lubricant through the primary gearbox lubricant supply lines 510 and the auxiliary gearbox lubricant supply lines 511.

The one or more valves 520 are passive valves such that the valve member 521 moves based on lubricant pressure of the lubricant in the lubricant supply lines 506. In particular, the one or more valves 520 include a spring 525 that is coupled to the valve member 521 for moving the valve member 521 between the fully opened position and the fully closed position, as detailed further below. The one or more valves 520 can move the valve member 521 anywhere between the fully opened position and the fully closed position to modulate the flow of the lubricant through the primary gearbox lubricant supply lines 510 and the auxiliary gearbox lubricant supply lines 511. In the fully closed position, the one or more valves 520 direct the lubricant to the lubricant supply 502 through the gearbox lubricant supply line 512. The spring 525 is oriented horizontally in the embodiment of FIG. 7 such that the valve member 521 moves horizontally between the fully opened position and the fully closed position. In some embodiments, the one or more valves 520 can be active valves that are controlled by the controller 90 (FIG. 1). The lubrication system 500 operates substantially the same as does the lubrication system 400 of FIG. 6.

FIG. 8 is a schematic diagram of a lubrication system 600 for the turbine engine 10, according to another embodiment. As shown in FIG. 8, the turbine engine 10 includes one or more turbine engine bearings 37 that support rotation of the propulsor shaft 45, the HP shaft 34, and the LP shaft 36. The one or more turbine engine bearings 37 include a first turbine engine bearing 37*a*, a second turbine engine bearing 37*b*, a third turbine engine bearing 37*c*, a fourth turbine engine bearing 37*d*, and a fifth turbine engine bearing 37*e*. The first turbine engine bearing 37*a* supports rotation of the propulsor shaft 45. The second turbine engine bearing 37*b* is positioned forward of the HP compressor 24 and supports rotation of the LP shaft 36. The third turbine engine bearing 37*c* is positioned forward of the HP compressor 24 and supports rotation of the HP shaft 34. The fourth turbine engine bearing 37*d* is positioned aft of the HP turbine 28 and forward of the LP turbine 30, and supports rotation of the HP shaft 34. The fifth turbine engine bearing 37*e* is positioned aft of the fourth turbine engine bearing 37*d* and supports rotation of the LP shaft 36.

The lubrication system 600 includes a lubricant pump 604 and one or more turbine engine lubricant supply lines 608 in fluid communication with the one or more turbine engine bearings 37 for lubricating the turbine engine bearings 37. The lubrication system 600 can also include a lubricant supply and a gearbox lubrication system that can include any of the lubricant supplies or gearbox lubrication systems detailed herein.

The one or more turbine engine lubricant supply lines 608 include a first turbine engine lubricant supply line 608*a*, a second turbine engine lubricant supply line 608*b*, a third turbine engine lubricant supply line 608*c*, a fourth turbine engine lubricant supply line 608*d*, and a fifth turbine engine lubricant supply line 608*e*. The first turbine engine lubricant supply line 608*a* is in fluid communication with the first turbine engine bearing 37*a*. The second turbine engine lubricant supply line 608*b* is in fluid communication with the second turbine engine bearing 37*b*. The third turbine engine lubricant supply line 608*c* is in fluid communication with the third turbine engine bearing 37*c*. The fourth turbine engine lubricant supply line 608*d* is in fluid communication with the fourth turbine engine bearing 37*d*. The fifth turbine engine lubricant supply line 608*e* is in fluid communication with the fifth turbine engine bearing 37*e*.

The lubrication system 600 also includes one or more turbine engine lubricant valves 630 in fluid communication with the one or more turbine engine lubricant supply lines 608. The one or more turbine engine lubricant valves 630 include a first turbine engine lubricant valve 630*a*, a second turbine engine lubricant valve 630*b*, a third turbine engine lubricant valve 630*c*, a fourth turbine engine lubricant valve 630*d*, and a fifth turbine engine lubricant valve 630*e*. The first turbine engine lubricant valve 630*a* is in fluid communication with the first turbine engine lubricant supply line 608*a*. The second turbine engine lubricant valve 630*b* is in fluid communication with the second turbine engine lubricant supply line 608*b*. The third turbine engine lubricant valve 630*c* is in fluid communication with the third turbine engine lubricant supply line 608*c*. The fourth turbine engine lubricant valve 630*d* is in fluid communication with the fourth turbine engine lubricant supply line 608*d*. The fifth turbine engine lubricant valve 630*e* is in fluid communication with the fifth turbine engine lubricant supply line 608*e*.

The turbine engine lubricant valves 630 are passive valves and can include any of the passive valves disclosed herein for modulating the flow of the lubricant through the turbine engine lubricant supply lines 608. In the embodiment of FIG. 8, the turbine engine lubricant valves 630 are disposed in the turbine engine lubricant supply lines 608 at a downstream end of the turbine engine lubricant supply lines 608. In particular, the turbine engine lubricant valves 630 are disposed at the turbine engine bearings 37. The turbine engine lubricant valves 630 open and close based on a lubricant pressure of the lubricant in the turbine engine lubricant supply lines 608. In particular, the one or more turbine engine lubricant valves 630 open and close between a fully opened position and a fully closed position. The one or more valves 320 can open and close anywhere between the fully opened position and the fully closed position to modulate the flow of the lubricant through the turbine engine lubricant supply lines 608.

During the high-power operation (e.g., the lubricant pressure is greater than a lubricant pressure threshold), the turbine engine lubricant valves 630 are in the fully opened position such that the turbine engine lubricant supply lines 608 direct the lubricant to the turbine engine bearings 37.

During the low-power operation or the mid-power operation (e.g., the lubricant pressure is less than a lubricant pressure threshold), the turbine engine lubricant valves 630 are in a partially opened position (e.g., between the fully opened position and the fully closed position). The turbine engine lubricant valves 630 can move to modulate the flow of the lubricant through the turbine engine lubricant supply lines 608 between the fully opened position and the fully closed position during the low-power conditions or the mid-power operations.

FIG. 9 is a schematic diagram of a lubrication system 700 for the turbine engine 10, according to another embodiment. The lubrication system 700 is substantially similar to the lubrication system 600 of FIG. 8. The same reference numerals or similar reference numerals will be used for components of the lubrication system 700 that are the same as or similar to the components of the lubrication system 600 discussed above. The description of these components above also applies to this embodiment, and a detailed description of these components is omitted here.

The lubrication system 700 includes a lubricant pump 704, and one or more turbine engine lubricant supply lines 708 in fluid communication with the one or more turbine engine bearings 37 for lubricating the turbine engine bearings 37, and one or more turbine engine lubricant valves 730 in fluid communication with the turbine engine lubricant supply lines 708. The lubrication system 700 can also include a lubricant supply and a gearbox lubrication system that can include any of the lubricant supplies or gearbox lubrication systems detailed herein.

The one or more turbine engine lubricant supply lines 708 include a first turbine engine lubricant supply line 708a, a second turbine engine lubricant supply line 708b, a third turbine engine lubricant supply line 708c, a fourth turbine engine lubricant supply line 708d, and a fifth turbine engine lubricant supply line 708e. The one or more turbine engine lubricant valves 730 include a first turbine engine lubricant valve 730a, a second turbine engine lubricant valve 730b, a third turbine engine lubricant valve 730c, a fourth turbine engine lubricant valve 730d, and a fifth turbine engine lubricant valve 730e.

In the embodiment of FIG. 9, the turbine engine lubricant valves 730 are disposed in the turbine engine lubricant supply lines 708 at an upstream end of the turbine engine lubricant supply lines 708. In particular, the turbine engine lubricant valves 730 are disposed at the lubricant pump 704. The turbine engine lubricant valves 730 open and close based on a lubricant pressure of the lubricant in the turbine engine lubricant supply lines 708. The lubrication system 700 operates substantially the same as does the lubrication system 600. In particular, the turbine engine lubricant valves 730 are open during the high-power operation and move to modulate the flow of the lubricant through the turbine engine lubricant supply lines 708 between the fully opened position and the fully closed position during the low-power conditions or the mid-power operations.

As mentioned earlier, the inventors sought to address the problem of sizing a lubrication system (an amount of lubrication) considering a balance between the material requirements (reducing damage to the gears and to the bearings) and the gearbox efficiency (fluidic losses due to friction and to windage of the gears or the bearings rotating within the lubricant) during an entire operating cycle of the turbine engine. By way of testing various turbine engine architectures, the inventors experimented with different configurations of the gearbox assembly and the lubrication system. In particular, the inventors experimented with different configurations of the number of second gears, the gearbox volume, the gearbox efficiency, the input shaft speed, the output shaft power, and the dT for a particular gearbox assembly and the amount of the lubricant needed for each particular configuration to satisfy the material requirement and the gearbox efficiency requirements over the entire operating cycle of the turbine engine. Additionally, there was a challenge in that the amount of lubricant for the lubrication system could not simply be scaled up as the gearbox assembly size increases.

During the course of evaluating the different embodiments set forth herein, with the goal of providing a lubrication system with an amount of lubricant necessary for reducing the damage to the gears and to the bearings during an entire operating cycle of the turbine engine, while accounting for loss due to the friction and the windage of the gears or of the bearings, the inventors discovered, unexpectedly, that the lubrication system indeed could not be merely scaled up or scaled down in size as the gearbox assembly increased or decreased in size for a particular gearbox assembly configuration. The inventors further discovered, unexpectedly, that a gearbox lubrication system designed at high-power conditions had more lubricant than needed to reduce the dT, to reduce the damage to the gears and the bearings, and, thus, the gearbox efficiency is reduced during the low-power conditions and the mid-power conditions.

After evaluating several different architectures of gearbox assemblies and lubrication systems with various amounts of lubricant, it was discovered, unexpectedly, that there is a relationship among the gearbox efficiency, the input shaft speed, the output shaft power, the gearbox volume, the number of second gears, and the dT for various operating levels of the operating cycle of the turbine engine for differentiating a lubrication system that satisfies the material requirements and the gearbox efficiency requirements from a lubrication system that does not satisfy these requirements. This relationship moreover is capable of uniquely identifying a finite and readily ascertainable number of embodiments suitable for a particular gearbox assembly and a particular turbine engine that accounts for the material requirement over the entirety of the operating cycle of the turbine engine without overly sacrificing the gearbox efficiency during each particular operating level. The inventors submit that the relationship enables one to select a size (e.g., mass flow rate of the lubricant and the temperature requirement) for the lubrication system that can reduce the damage to the gears and to the bearings, while accounting for the gearbox efficiency for a particular size of the gearbox assembly for the entirety of the operating cycle of the turbine engine. This relationship is referred to as a Gearbox Lubrication System Parameter (GLSP), in relationship (1):

$$GLSP = \frac{(1-\eta_{DP})}{N_{DP}^3 \times V_{GBX} \times N_S} \times \frac{dT_{OC}}{dT_{DP}} \times \frac{P_{DP}}{P_{OC}} \times \left(\frac{N_{DP}}{N_{OC}}\right)^2 \times 10^8 \quad (1)$$

The GLSP in relationship (1) is valid for embodiments in which the mass flow rate of the lubricant is linear with the speed of the lubricant pump (e.g., the embodiment of FIGS. 2 to 4) and, in which, $\eta_{DP}$ is the gearbox efficiency at a design point operating condition (e.g., the high-power operation), $N_{DP}$ is the input shaft (e.g., LP shaft 36) speed at the design point operating condition, $V_{GBX}$ is the gearbox volume in cubic meters (m³), $N_S$ is the number of second gears, $dT_{OC}/dT_{DP}$ is a ratio of a change in lubricant temperature ($dT_{OC}$) at a particular operating condition (e.g., low-power operation, mid-power operation, or high-power operation) versus a change in the lubricant temperature ($dT_{DP}$) at the design point operating condition, $P_{DP}/P_{OC}$ is a gearbox power ratio of the output shaft (e.g., propulsor shaft 45) power ($P_{DP}$) at the design point operating condition versus the output shaft power ($P_{OC}$) at the particular operating condition, and $N_{DP}/N_{OC}$ is a gearbox speed ratio of the inlet shaft speed ($N_{DP}$) at the design point operating condition versus the inlet shaft speed ($N_{OC}$) at the particular operating condition. The change in the lubricant temperature is the temperature of the lubricant at the outlet of the gearbox assembly (e.g., the gearbox lubricant return line 112 in FIG. 3A) minus the temperature of the lubricant at an inlet of the gearbox assembly (e.g., the gearbox lubricant supply lines 110).

The design point operating condition is selected to design the gearbox lubrication system (e.g., mass flow rate of the lubricant and the temperature of the lubricant) for a particular sizing of the gearbox assembly. In particular, the design point operating condition is the high-power condition (e.g., takeoff). The particular operating condition can be any one of the low-power operation, the mid-power operation, or the high-power operation. For example, one of the low-power operation, the mid-power operation, or the high-power operation can be used as the particular operating condition. The ranges disclosed herein are valid for the design point operating condition and the particular operating condition being the same or being different.

The inventors also discovered a GLSP applicable for embodiments in which the mass flow rate of the lubricant is modulated (e.g., the embodiments of FIGS. 4 to 9). This relationship is provided by relationship (2):

$$GLSP = \frac{(1-\eta_{DP})}{N_{DP}^3 \times V_{GBX} \times N_S} \times \alpha \frac{dT_{OC}}{dT_{DP}} \times \frac{P_{DP}}{P_{OC}} \times \left(\frac{N_{DP}}{N_{OC}}\right)^2 \times 10^8 \quad (2)$$

The GLSP in relationship (2) is valid for embodiments in which the mass flow rate of the lubricant is modulated (e.g., the mass flow rate is not a linear relationship with the lubricant pump speed). In relationship (2), the $dT_{OC}/dT_{DP}$ is a function of proportionality ($\alpha$) that accounts for both the lubricant flow reduction and the relative increase in temperature across the gearbox assembly for the particular operating condition. The proportionality ($\alpha$) is in a range between point five and one (0.5 and 1.0).

As discussed further below, the inventors identified a range for the GLSP that enables a lubrication system design for operating the gearbox assembly 46 at an improved efficiency during an entire operating cycle of the turbine engine 10. Lubrication systems that fall within this range provide for an amount of the lubricant and a temperature of the lubricant for reducing damage to the gear assembly 47, while minimizing gearbox losses (e.g., due to friction and windage of the gears 49) and maximizing the gearbox efficiency for all operating conditions of the gearbox assembly 46 over the entire operating cycle of the turbine engine 10.

Table 1 represents exemplary embodiments 1 to 4 and their corresponding GLSP values for various turbine engines.

TABLE 1

| Emb. | Gearbox Efficiency, $\eta_{DP}$ | LP Shaft Speed, $N_{DP}$ (HZ) | Gearbox Volume, $V_{GBX}$ (m³) | Number of Second Gears, $N_S$ | $dT_{OC}/dT_{DP}$ | $\alpha$ | $P_{OC}/P_{DP}$ | $N_{OC}/N_{DP}$ | GLSP |
|---|---|---|---|---|---|---|---|---|---|
| 1 | 99.35% | 133 | 0.009 | 4 | 0.7 | — | 0.6 | 0.8 | 13.9 |
| 2 | 99.20% | 116 | 0.009 | 4 | 0.25 | — | 0.1 | 0.5 | 140 |
| 3 | 99.60% | 150 | 0.03 | 6 | 0.8 | 0.5 | 0.2 | 0.7 | 2.7 |
| 4 | 99.50% | 133 | 0.01 | 5 | 0.6 | 0.75 | 0.8 | 0.88 | 3 |

The GLSP is valid for gearbox assemblies with a gearbox efficiency between 99.2% and 99.8%. The GLSP is valid for turbine engines with an input shaft speed ($N_{TO}$) between one hundred sixteen Hertz and one hundred sixty-seven Hertz (116 Hz and 167 Hz). The GLSP is valid for gearbox assemblies with a gearbox volume between nine thousandths cubic meters and three hundredths cubic meters (0.009 m³ and 0.03 m³). The GLSP is valid for gearbox assemblies with a number of second gears between four and eight (4 and 8). The GLSP is valid for $dT_{DP}$ between twenty-five degrees Celsius and fifty degrees Celsius (25° C. and 50° C.). In particular, if the $dT_{DP}$ is greater than fifty degrees Celsius (50° C.), then this indicates there is not enough lubricant in the lubrication system for the design point operating condition and the gears may become damaged. If $dT_{DP}$ is less than twenty-five degrees Celsius (25° C.), then this indicates that there is too much lubricant in the lubrication system for the design point operating condition, and, thus, there will be increased losses due to windage. Therefore, the range of $dT_{DP}$ provides for an amount of lubricant in the lubrication system for preventing damage to the gears, while also reducing or minimizing losses due to windage. The GLSP is valid for $dT_{OC}/dT_{DP}$ between zero point twenty-five and one (0.25 and 1) for embodiments in which the mass flow rate of the lubricant is linear with lubricant pump speed. The GLSP is valid for $dT_{OC}/dT_{DP}$ between zero point one two five and one (0.125 and 1) for embodiments in which the mass flow rate of the lubricant is modulated.

The GLSP is valid for propulsor shaft power ($P_{DP}$) at the design point operating condition between twelve and thirty megawatts (12 MW and 30 MW). The GLSP is valid for $P_{OC}/P_{DP}$ between ten percent (10%) and one hundred percent (100%). $P_{OC}/P_{DP}$ is an inverse of $P_{DP}/P_{OC}$ in relationships (1) and (2) and is the gearbox power ratio of the output shaft (e.g., propulsor shaft 45) power ($P_{OC}$) at the particular operating condition versus the output shaft power ($P_{DP}$) at the design point operating condition. The GLSP is valid for $N_{OC}/N_{DP}$ between fifty percent (50%) and one hundred percent (100%). $N_{OC}/N_{DP}$ is an inverse of $N_{DP}/N_{OC}$ in relationships (1) and (2) and is the gearbox speed ratio of the inlet shaft speed ($N_{OC}$) at the particular operating condition versus the inlet shaft speed ($N_{DP}$) at the design point operating condition.

Figure 10:
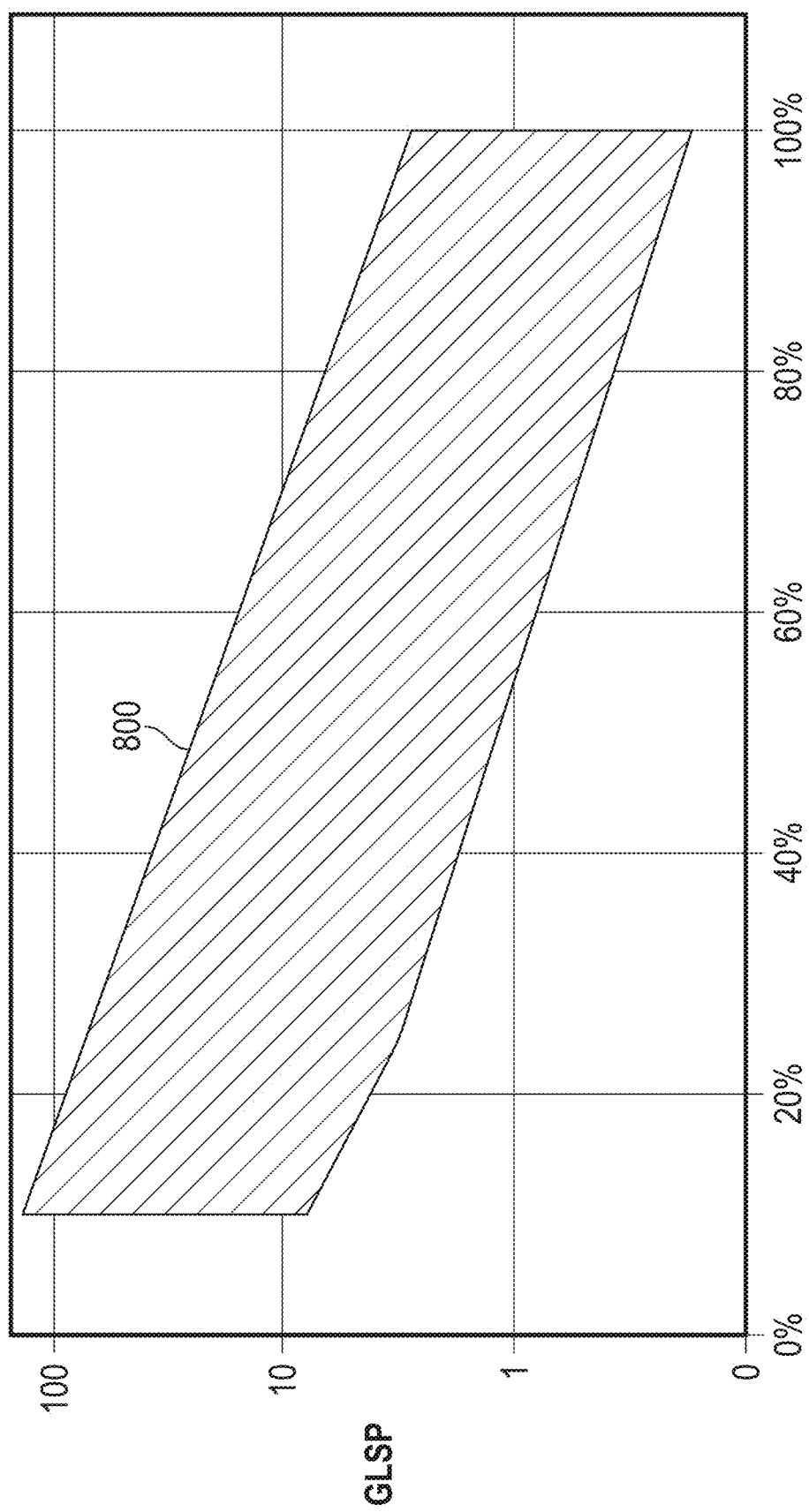
FIG. 10 represents, in graph form, a gearbox lubrication system parameter (GLSP) as a function of a gearbox power ratio, according to the present disclosure.

FIG. 10 represents, in graph form, the GLSP as a function of the gearbox power ratio ($P/P_{OC}$), according to the present disclosure. An area 800 represents the boundaries of the GLSP for embodiments in which the mass flow rate of the lubricant is linear with lubricant pump speed. In such embodiments, the GLSP is determined based on relationship (1) above and is in a range between two tenths and one hundred forty (0.2 and 140) for a gearbox power ratio between ten percent (10%) and one hundred percent (100%). Table 1 and FIG. 10 show that the GLSP decreases as the gearbox power ratio increases. The range of the GLSP identifies the specific architectures (gearbox volume, gearbox power, and gearbox speed), amounts of lubricant, and lubricant temperature needed to reduce the damage to the gears and to the bearings, while accounting for the gearbox efficiency at the various operating conditions throughout the entirety of the operating cycle of the turbine engine. In particular, if the GLSP is within the area 800, then the lubrication system has an amount of lubricant and a lubricant temperature that minimize the gearbox assembly losses (e.g., maximize efficiency), while reducing damage to the gears during entire operating cycle of the turbine engine (e.g., during low-power operation, mid-power operation, and high-power operation). If the GLSP is outside of the area 800, then either there is too much lubricant or too little lubricant such that the gearbox assembly losses are too great (e.g., due to too much lubricant for a particular operating condition), or the gears will become damaged sooner than if the GLSP is within the area 800 (e.g., due to too little lubricant for a particular operating condition) during one or more of the low-power operation, the mid-power operation, or the high-power operation. Thus, the lubrication system having a GLSP within the area 800 provides for an improved lubrication system that reduces the damage to the gears and to the bearings, while accounting for the gearbox efficiency at the various operating conditions throughout the entirety of the operating cycle of the turbine engine.

Figure 11:
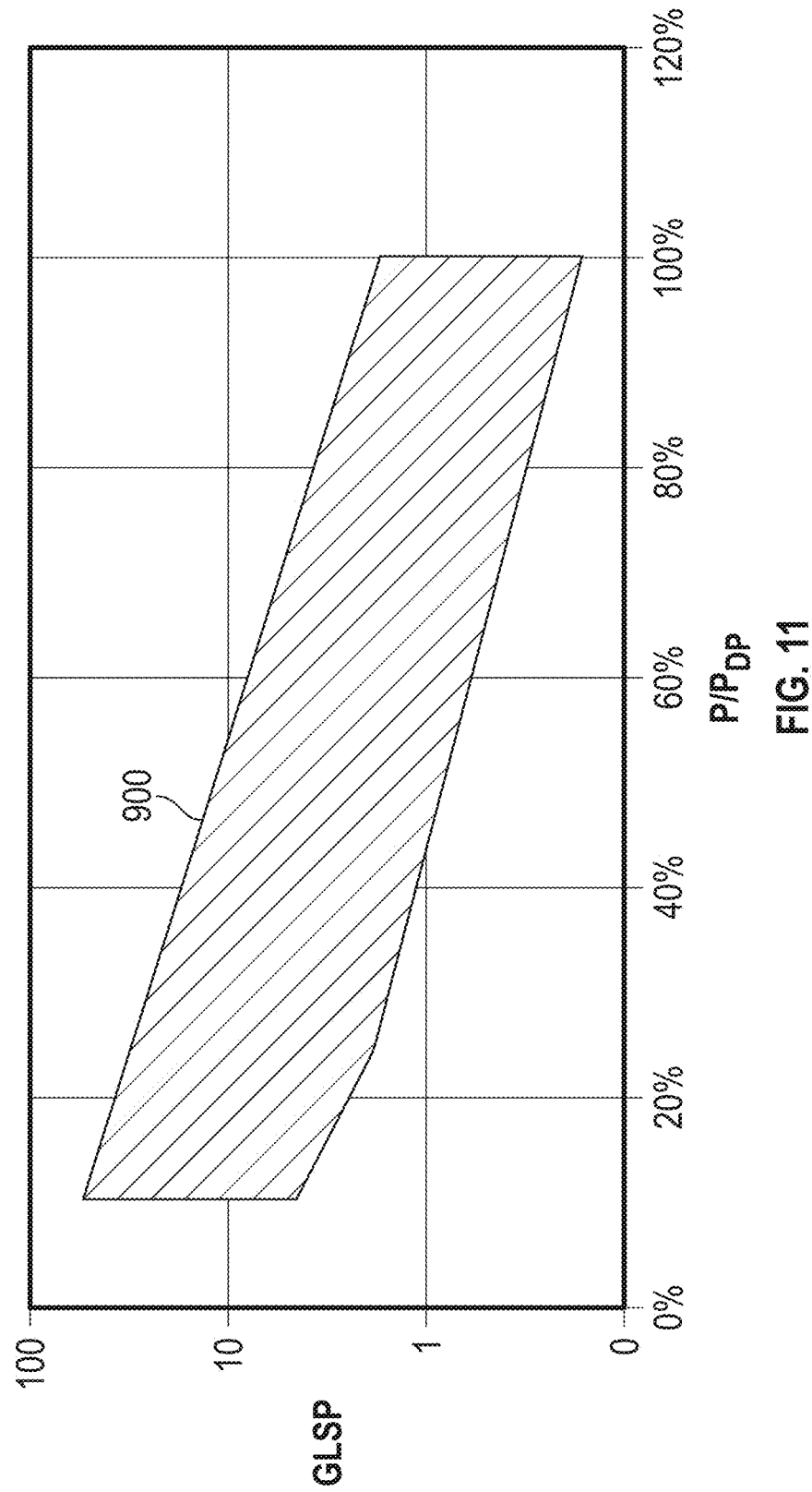
FIG. 11 represents, in graph form, a gearbox lubrication system parameter (GLSP) as a function of a gearbox power ratio, according to another embodiment.

FIG. 11 represents, in graph form, the GLSP as a function of the gearbox power ratio ($P/P_{OC}$), according to another embodiment. An area 900 represents the boundaries of the GLSP for embodiments in which the mass flow rate of the lubricant is modulated. In such embodiments, the GLSP is determined based on relationship (2) above and is in a range between two tenths and seventy (0.2 and 70) for a gearbox power ratio between ten percent (10%) and one hundred percent (100%). Table 1 and FIG. 11 show that the GLSP decreases as the gearbox power ratio increases. The range of the GLSP identifies the specific architectures (gearbox volume, gearbox power, and gearbox speed), amounts of lubricant, and lubricant temperature needed to reduce the damage to the gears and to the bearings, while accounting for the gearbox efficiency at the various operating conditions throughout the entirety of the operating cycle of the turbine engine. In particular, if the GLSP is within the area 900, then the lubrication system has an amount of lubricant and a lubricant temperature that minimize the gearbox assembly losses (e.g., maximize efficiency), while reducing damage to the gears during entire operating cycle of the turbine engine (e.g., during low-power operation, mid-power operation, and high-power operation). If the GLSP is outside of the area 900, then either there is too much lubricant or too little lubricant such that the gearbox assembly losses are too great, or the gears will become damaged sooner than if the GLSP is within the area 800 during one or more of the low-power operation, the mid-power operation, or the high-power operation. Thus, the lubrication system having a GLSP within the area 900 provides for an improved lubrication system that reduces the damage to the gears and to the bearings, while accounting for the gearbox efficiency at the various operating conditions throughout the entirety of the operating cycle of the turbine engine.

Further aspects of the present disclosure are provided by the subject matter of the following clauses.

A turbine engine comprises a turbo-engine including a compressor section, a combustor, and a turbine section, the turbo-engine having an input shaft that couples the compressor section to the turbine section, a gearbox assembly including a gear assembly having a plurality of gears including a first gear, a plurality of second gears meshing with the first gear, and a third gear meshing with the plurality of second gears, a propulsor having an output shaft drivingly coupled to the input shaft through the gear assembly, and a lubrication system including a lubricant supply that stores lubricant therein, one or more lubricant supply lines, and a lubricant pump for supplying the lubricant to the gearbox assembly from the lubricant supply through the one or more lubricant supply lines at a mass flow rate that is linear with a lubricant pump speed of the lubricant pump, the lubrication system being characterized by a Gearbox Lubrication System Parameter (GLSP) between 0.2 and 140, the GLSP being given by:

$$\frac{(1-\eta_{DP})}{N_{DP}^3 \times V_{GBX} \times N_S} \times \alpha \frac{dT_{OC}}{dT_{DP}} \times \frac{P_{DP}}{P_{OC}} \times \left(\frac{N_{DP}}{N_{OC}}\right)^2 \times 10^8$$

$\eta_{DP}$ being a gearbox efficiency of the gearbox assembly at a design point operating condition, $N_{DP}$ is an input shaft speed of the input shaft at the design point operating condition, $V_{GBX}$ is a gearbox volume of the gearbox assembly, $N_S$ is a number of the plurality of second gears, $dT_{OC}/dT_{DP}$ is a gearbox temperature ratio of a change in a temperature of the lubricant at a particular operating condition to the change in the temperature of the lubricant at the design point operating condition, $P_{DP}/P_{OC}$ is a gearbox power ratio of a power of the output shaft at the design point operating condition to the power of the output shaft at the particular operating condition, and $N_{DP}/N_{OC}$ is a gearbox speed ratio of the input shaft speed at the design point operating condition to the input shaft speed at the particular operating condition.

The turbine engine of the preceding clause, $\eta_{DP}$ being between 99.2% and 99.8%.

The turbine engine of any preceding clause, $N_{DP}$ being between 116 Hertz and 167 Hertz.

The turbine engine of any preceding clause, $V_{GBX}$ being between 0.009 m³ and 0.03 m³.

The turbine engine of any preceding clause, $N_S$ being between 4 and 8.

The turbine engine of any preceding clause, $dT_{OC}/dT_{DP}$ being between 0.25 and 1.

The turbine engine of any preceding clause, $P_{OC}/P_{DP}$ being between 10% and 100%, and $P_{OC}/P_{DP}$ is an inverse of $P_{DP}/P_{OC}$.

The turbine engine of any preceding clause, $N_{OC}/N_{DP}$ being between 50% and 100%, and $N_{OC}/N_{DP}$ is an inverse of $N_{DP}/N_{OC}$.

The turbine engine of any preceding clause, $P_{DP}$ being between 12 megawatts and 30 megawatts.

The turbine engine of any preceding clause, $dT_{DP}$ being between 25° C. and 50° C.

A turbine engine comprises a turbo-engine including a compressor section, a combustor, and a turbine section, the turbo-engine having an input shaft that couples the compressor section to the turbine section, a gearbox assembly including a gear assembly having a plurality of gears including a first gear, a plurality of second gears meshing with the first gear, and a third gear meshing with the plurality of second gears, a propulsor having an output shaft drivingly coupled to the input shaft through the gear assembly, and a lubrication system including a lubricant supply that stores lubricant therein, one or more lubricant supply lines, and a lubricant pump for supplying the lubricant to the gearbox assembly from the lubricant supply, the lubrication system modulating a mass flow rate of the lubricant to the gearbox assembly, and the lubrication system being characterized by a Gearbox Lubrication System Parameter (GLSP) between 0.2 and 70, the GLSP being given by:

$$\frac{(1-\eta_{DP})}{N_{DP}^3 \times V_{GBX} \times N_S} \times \alpha \frac{dT_{OC}}{dT_{DP}} \times \frac{P_{DP}}{P_{OC}} \times \left(\frac{N_{DP}}{N_{OC}}\right)^2 \times 10^8$$

$\eta_{DP}$ being a gearbox efficiency of the gearbox assembly at a design point operating condition, $N_{DP}$ is an input shaft speed of the input shaft at the design point operating condition, $V_{GBX}$ is a gearbox volume of the gearbox assembly, $N_S$ is a number of the plurality of second gears, $dT_{OC}/dT_{DP}$ is a gearbox temperature ratio of a change in a temperature of the lubricant at a particular operating condition to the change in the temperature of the lubricant at the design point operating condition, a is proportionality between 0.5 and 1.0, $P_{DP}/P_{OC}$ is a gearbox power ratio of a power of the output shaft at the design point operating condition to the power of the output shaft at the particular operating condition, and $N_{DP}/N_{OC}$ is a gearbox speed ratio of the input shaft speed at the design point operating condition to the input shaft speed at the particular operating condition.

The turbine engine of any preceding clause, $\eta_{DP}$ being between 99.2% and 99.8%.

The turbine engine of any preceding clause, $N_{DP}$ being between 116 Hertz and 167 Hertz.

The turbine engine of any preceding clause, $V_{GBX}$ being between 0.009 m³ and 0.03 m³.

The turbine engine of any preceding clause, $N_S$ being between 4 and 8.

The turbine engine of any preceding clause, $dT_{OC}/dT_{DP}$ being between 0.125 and 1.

The turbine engine of any preceding clause, $P_{OC}/P_{DP}$ being between 10% and 100%, and $P_{OC}/P_{DP}$ is an inverse of $P_{DP}/P_{OC}$.

The turbine engine of any preceding clause, $N_{OC}/N_{DP}$ being between 50% and 100%, and $N_{OC}/N_{DP}$ is an inverse of $N_{DP}/N_{OC}$.

The turbine engine of any preceding clause, $P_{DP}$ being between 12 megawatts and 30 megawatts.

The turbine engine of any preceding clause, $dT_{DP}$ being between 25° C. and 50° C.

The turbine engine of any preceding clause, the one or more lubricant supply lines including one or more primary gearbox lubricant supply lines in fluid communication with the lubricant tank and the gearbox assembly, one or more auxiliary gearbox lubricant supply lines in fluid communication with the lubricant tank and the gearbox assembly, the lubrication system modulating the mass flow rate of the lubricant to the gearbox assembly through at least one of the one or more primary gearbox lubricant supply lines or the one or more auxiliary gearbox lubricant supply lines.

The turbine engine of any preceding clause, the plurality of gears meshing with each other at a mesh, the one or more primary gearbox lubricant supply lines and the one or more auxiliary gearbox lubricant supply lines directing the lubricant to the mesh.

The turbine engine of any preceding clause, the one or more primary gearbox lubricant supply lines including a first primary gearbox lubricant supply line in fluid communication with the mesh.

The turbine engine of any preceding clause, the one or more auxiliary gearbox lubricant supply lines including a first auxiliary gearbox lubricant supply line in fluid communication with the mesh.

The turbine engine of any preceding clause, the gear assembly including one or more bearings, the one or more primary gearbox lubricant supply lines and the one or more auxiliary gearbox lubricant supply lines directing the lubricant to the one or more bearings.

The turbine engine of any preceding clause, the one or more primary gearbox lubricant supply lines including a second primary gearbox lubricant supply line in fluid communication with the one or more bearings.

The turbine engine of any preceding clause, the one or more auxiliary gearbox lubricant supply lines including a second auxiliary gearbox lubricant supply line in fluid communication with the one or more bearings.

The turbine engine of any preceding clause, the lubrication system further comprising one or more valves disposed in at least one of the one or more primary gearbox lubricant supply lines or the one or more primary gearbox lubricant supply lines for modulating the mass flow rate of the lubricant to the gearbox assembly.

The turbine engine of any preceding clause, the one or more valves including a first valve disposed in the one or more primary gearbox lubricant supply lines for modulating the mass flow rate of the lubricant to the gearbox assembly through the one or more primary gearbox lubricant supply lines.

The turbine engine of any preceding clause, the first valve being a proportional modulating valve that includes a first valve member that moves between a fully opened position and a fully closed position to modulate the mass flow rate of the lubricant through the one or more primary gearbox lubricant supply lines.

The turbine engine of any preceding clause, the one or more valves including a second valve disposed in the one or more auxiliary gearbox lubricant supply lines for modulating the mass flow rate of the lubricant to the gearbox assembly through the one or more auxiliary gearbox lubricant supply lines.

The turbine engine of any preceding clause, the second valve being a shut-off valve that includes a second valve member that moves between an opened position and a closed position to turn on or to turn off the lubricant through the one or more auxiliary gearbox lubricant supply lines.

The turbine engine of any preceding clause, the one or more valves being controlled by a controller.

The turbine engine of any preceding clause, the one or more valves being passive valves such that the one or more valves open or close based on a lubricant pressure of the lubricant in at least one of the one or more primary gearbox lubricant supply lines or the one or more auxiliary gearbox lubricant supply lines.

The turbine engine of any preceding clause, the one or more valves including a spring that is coupled to the valve member for moving the valve member between the fully opened position and the fully closed position.

The turbine engine of any preceding clause, the one or more valves including a three-way valve that receives the lubricant from the lubricant supply and modulates the lubricant through the one or more primary gearbox lubricant supply lines and the one or more auxiliary gearbox lubricant supply lines.

The turbine engine of any preceding clause, further comprising one or more turbine engine bearings, the lubrication system further comprising one or more turbine engine lubricant supply lines in fluid communication with the lubricant tank and the one or more turbine engine bearings, the lubricant pump supplying the lubricant to the one or more turbine engine bearings from the lubricant tank through the one or more turbine engine lubricant supply lines, the lubrication system modulating a mass flow rate of the lubricant to the one or more turbine engine bearings through the one or more turbine engine lubricant supply lines.

The turbine engine of any preceding clause, the lubrication system further comprising one or more turbine engine lubricant valves disposed in the turbine engine lubricant supply lines for modulating the mass flow rate of the lubricant to the gearbox assembly.

The turbine engine of any preceding clause, the one or more turbine engine lubricant valves being disposed at a downstream end of the turbine engine lubricant supply lines at the one or more turbine engine bearings.

The turbine engine of any preceding clause, the one or more turbine engine lubricant valves being disposed at an upstream end of the turbine engine lubricant supply lines at the lubricant supply pump.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A turbine engine comprising:
a turbo-engine including a compressor section, a combustor, and a turbine section, the turbo-engine having an input shaft that couples the compressor section to the turbine section;
a gearbox assembly including a gear assembly having a plurality of gears including a first gear, a plurality of second gears meshing with the first gear, and a third gear meshing with the plurality of second gears;
a propulsor having an output shaft drivingly coupled to the input shaft through the gear assembly; and
a lubrication system including a lubricant supply that stores lubricant therein, one or more lubricant supply lines, and a lubricant pump for supplying the lubricant to the gearbox assembly from the lubricant supply through the one or more lubricant supply lines at a mass flow rate that is linear with a lubricant pump speed of the lubricant pump, the lubrication system being characterized by a Gearbox Lubrication System Parameter (GLSP) between 0.2 and 140, the GLSP being given by:

$$\frac{(1-\eta_{DP})}{N_{DP}^3 \times V_{GBX} \times N_S} \times \alpha \frac{dT_{OC}}{dT_{DP}} \times \frac{P_{DP}}{P_{OC}} \times \left(\frac{N_{DP}}{N_{OC}}\right)^2 \times 10^8$$

wherein $\eta_{DP}$ is a gearbox efficiency of the gearbox assembly at a design point operating condition, $N_{DP}$ is an input shaft speed of the input shaft at the design point operating condition, $V_{GBX}$ is a gearbox volume of the gearbox assembly, $N_S$ is a number of the plurality of second gears, $dT_{OC}/dT_{DP}$ is a gearbox temperature ratio of a change in a temperature of the lubricant at a particular operating condition to the change in the temperature of the lubricant at the design point operating condition, $P_{DP}/P_{OC}$ is a gearbox power ratio of a power of the output shaft at the design point operating condition to the power of the output shaft at the particular operating condition, and $N_{DP}/N_{OC}$ is a gearbox speed ratio of the input shaft speed at the design point operating condition to the input shaft speed at the particular operating condition.

2. The turbine engine of claim 1, wherein $\eta_{DP}$ is between 99.2% and 99.8%.

3. The turbine engine of claim 1, wherein $N_{DP}$ is between 116 Hertz and 167 Hertz.

4. The turbine engine of claim 1, wherein $V_{GBX}$ is between 0.009 m$^3$ and 0.03 m$^3$.

5. The turbine engine of claim 1, wherein $N_S$ is between 4 and 8.

6. The turbine engine of claim 1, wherein $dT_{OC}/dT_{DP}$ is between 0.25 and 1.

7. The turbine engine of claim 1, wherein $P_{OC}/P_{DP}$ is between 10% and 100%, and $P_{OC}/P_{DP}$ is an inverse of $P_{DP}/P_{OC}$.

8. The turbine engine of claim 1, wherein $N_{OC}/N_{DP}$ is between 50% and 100%, and $N_{OC}/N_{DP}$ is an inverse of $N_{DP}/N_{OC}$.

9. The turbine engine of claim 1, wherein $P_{DP}$ is between 12 megawatts and 30 megawatts.

10. The turbine engine of claim 1, wherein $dT_{DP}$ is between 25° C. and 50° C.

11. A turbine engine comprising:
a turbo-engine including a compressor section, a combustor, and a turbine section, the turbo-engine having an input shaft that couples the compressor section to the turbine section;
a gearbox assembly including a gear assembly having a plurality of gears including a first gear, a plurality of second gears meshing with the first gear, and a third gear meshing with the plurality of second gears;
a propulsor having an output shaft drivingly coupled to the input shaft through the gear assembly; and a lubrication system including a lubricant supply that stores lubricant therein, one or more lubricant supply lines, and a lubricant pump for supplying the lubricant to the gearbox assembly from the lubricant supply, the lubrication system modulating a mass flow rate of the lubricant to the gearbox assembly, and the lubrication system being characterized by a Gearbox Lubrication System Parameter (GLSP) between 0.2 and 70, the GLSP being given by:

$$\frac{(1-\eta_{DP})}{N_{DP}^3 \times V_{GBX} \times N_S} \times \alpha \frac{dT_{OC}}{dT_{DP}} \times \frac{P_{DP}}{P_{OC}} \times \left(\frac{N_{DP}}{N_{OC}}\right)^2 \times 10^8$$

wherein $\eta_{DP}$ is a gearbox efficiency of the gearbox assembly at a design point operating condition, $N_{DP}$ is an input shaft speed of the input shaft at the design point operating condition, $V_{GBX}$ is a gearbox volume of the gearbox assembly, $N_S$ is a number of the plurality of second gears, $dT_{OC}/dT_{DP}$ is a gearbox temperature ratio of a change in a temperature of the lubricant at a particular operating condition to the change in the temperature of the lubricant at the design point operating condition, $\alpha$ is proportionality between 0.5 and 1.0, $P_{DP}/P_{OC}$ is a gearbox power ratio of a power of the output shaft at the design point operating condition to the power of the output shaft at the particular operating condition, and $N_{DP}/N_{OC}$ is a gearbox speed ratio of the input shaft speed at the design point operating condition to the input shaft speed at the particular operating condition.

12. The turbine engine of claim 11, wherein $\eta_{DP}$ is between 99.2% and 99.8%.

13. The turbine engine of claim 11, wherein $N_{DP}$ is between 116 Hertz and 167 Hertz.

14. The turbine engine of claim 11, wherein $V_{GBX}$ is between 0.009 m³ and 0.03 m³.

15. The turbine engine of claim 11, wherein $N_S$ is between 4 and 8.

16. The turbine engine of claim 11, wherein $dT_{OC}/dT_{DP}$ is between 0.125 and 1.

17. The turbine engine of claim 11, wherein $P_{OC}/P_{DP}$ is between 10% and 100%, and $P_{OC}/P_{DP}$ is an inverse of $P_{DP}/P_{OC}$.

18. The turbine engine of claim 11, wherein $N_{OC}/N_{DP}$ is between 50% and 100%, and $N_{OC}/N_{DP}$ is an inverse of $N_{DP}/N_{OC}$.

19. The turbine engine of claim 11, wherein $P_{DP}$ is between 12 megawatts and 30 megawatts.

20. The turbine engine of claim 11, wherein $dT_{DP}$ is between 25° C. and 50° C.

* * * * *